(12) United States Patent
Shah et al.

(10) Patent No.: US 8,995,029 B2
(45) Date of Patent: *Mar. 31, 2015

(54) ULTRASHORT LASER MICRO-TEXTURE PRINTING

(71) Applicant: IMRA America, inc., Ann Arbor, MI (US)

(72) Inventors: Lawrence Shah, Maitland, FL (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,434

(22) Filed: Mar. 5, 2014

(65) Prior Publication Data

US 2014/0185065 A1 Jul. 3, 2014

Related U.S. Application Data

(63) Continuation of application No. 13/799,754, filed on Mar. 13, 2013, now Pat. No. 8,670,151, which is a
(Continued)

(51) Int. Cl.
*H04N 1/04* (2006.01)
*G06K 15/12* (2006.01)
(Continued)

(52) U.S. Cl.
CPC ............. *G06K 15/1209* (2013.01); *B41J 2/442* (2013.01); *B41J 2/471* (2013.01);
(Continued)

(58) Field of Classification Search
CPC . H04N 1/40037; H04N 1/407; H04N 9/3129; H04N 9/3167; B41J 2/442; B41J 2/471; G06K 15/1209; G06K 15/129; B29C 45/00; G03F 1/144; G03F 7/0005; G03F 7/2014; G03F 7/7035

USPC .......... 358/1.7, 474, 488, 100, 106, 218, 565, 358/111, 130, 159, 284

See application file for complete search history.

(56) References Cited

U.S. PATENT DOCUMENTS

| 4,931,882 A | 6/1990 | Takeda et al. |
| 5,011,295 A | 4/1991 | Krishnan et al. |

(Continued)

FOREIGN PATENT DOCUMENTS

| JP | H06-339784 | 12/1994 |
| JP | 2002-072493 | 3/2002 |

(Continued)

OTHER PUBLICATIONS

P.S. Banks et al., "Material effects in ultra-short pulse laser drilling of metals," Appl. Phys. A 69 [Suppl.], S377-S380, Published online Dec. 28, 1999.
(Continued)

*Primary Examiner* — Negussie Worku
(74) *Attorney, Agent, or Firm* — Knobbe, Martens, Olson & Bear, LLP

(57) ABSTRACT

Systems and methods for providing laser texturing of solid substrates are disclosed. The texturing may be used to provide grayscale images obtainable from substrates, which may include steel, aluminum, glass, and silicon. In some embodiments, images may be obtainable from the substrate by modifying the reflective, diffractive, and/or absorptive features of the substrate or the substrate surface by forming random, periodic, and/or semi-periodic micro-structure features on the substrate (or substrate surface) by an ultrafast laser pulse train. The ultrafast pulse train may be modulated in order to vary, for example, optical exposure time, pulse train intensity, laser polarization, laser wavelength, or a combination of the aforementioned. The ultrafast pulse train and the substrate may be scanned with respect to each other to provide different optical energies to different regions of the substrate (or substrate surface). In some embodiments, the image is provided by making one or more passes of the ultrafast laser pulse train relative to the substrate.

17 Claims, 8 Drawing Sheets

Related U.S. Application Data continuation of application No. 12/495,609, filed on Jun. 30, 2009, now Pat. No. 8,405,885, which is a continuation of application No. PCT/US2008/051713, filed on Jan. 22, 2008.

(60) Provisional application No. 60/866,285, filed on Jan. 23, 2007.

(51) Int. Cl.
*B41J 2/44* (2006.01)
*B41J 2/47* (2006.01)
*H04N 1/40* (2006.01)
*H04N 1/407* (2006.01)

(52) U.S. Cl.
CPC ......... *H04N 1/40037* (2013.01); *G06K 15/129* (2013.01); *H04N 1/407* (2013.01)
USPC ........... 358/474; 358/475; 382/144; 430/321; 264/328.1; 359/216.1

(56) References Cited

U.S. PATENT DOCUMENTS

| | | | |
|---|---|---|---|
| 5,097,342 A | 3/1992 | Agano | |
| 5,337,076 A | 8/1994 | Agano | |
| 5,499,134 A | 3/1996 | Galvanauskas | |
| 5,521,987 A | 5/1996 | Masaki | |
| 5,539,175 A | 7/1996 | Smith | |
| 5,694,331 A | 12/1997 | Yamamoto | |
| 5,696,782 A | 12/1997 | Harter | |
| 5,801,312 A | 9/1998 | Lorraine | |
| 5,818,630 A | 10/1998 | Fermann et al. | |
| 6,172,325 B1 | 1/2001 | Baird | |
| 6,183,933 B1 | 2/2001 | Ishikawa | |
| 6,219,438 B1 | 4/2001 | Giordano et al. | |
| 6,498,685 B1 * | 12/2002 | Johnson | 359/626 |
| 6,659,580 B2 | 12/2003 | Horikoshi | |
| 6,778,290 B2 | 8/2004 | Oehlbeck et al. | |
| 6,876,377 B2 | 4/2005 | Endo | |
| 6,952,294 B2 | 10/2005 | Ishikawa et al. | |
| 6,975,778 B1 | 12/2005 | Loce | |
| 7,113,327 B2 | 9/2006 | Gu | |
| 7,164,117 B2 * | 1/2007 | Breed et al. | 250/221 |
| 7,391,542 B2 | 6/2008 | Tanimura et al. | |
| 7,415,126 B2 * | 8/2008 | Breed et al. | 382/100 |
| 7,583,417 B2 | 9/2009 | Bush et al. | |
| 7,663,502 B2 * | 2/2010 | Breed | 340/12.25 |
| 7,805,679 B2 | 9/2010 | Takahira | |
| 7,821,678 B2 | 10/2010 | Tomita | |
| 7,851,318 B2 * | 12/2010 | Koyama et al. | 438/311 |
| 7,920,304 B2 | 4/2011 | Tatsuno et al. | |
| 8,030,169 B2 * | 10/2011 | Kakehata et al. | 438/404 |
| 8,045,762 B2 | 10/2011 | Otani | |
| 8,078,875 B2 | 12/2011 | Cowburn | |
| 8,168,955 B2 | 5/2012 | Sutko et al. | |
| 8,379,679 B2 | 2/2013 | Zhang | |
| 8,405,885 B2 | 3/2013 | Shah | |
| 8,505,885 B2 * | 8/2013 | Hildebrand et al. | 261/122.1 |
| 8,670,151 B2 * | 3/2014 | Shah et al. | 358/1.7 |
| 2002/0097384 A1 | 7/2002 | Nishikawa | |
| 2002/0130281 A1 | 9/2002 | Arakawa | |
| 2003/0001945 A1 | 1/2003 | Maeda | |
| 2003/0195883 A1 | 10/2003 | Mojsilovic | |
| 2004/0179051 A1 | 9/2004 | Tainer | |
| 2004/0240037 A1 | 12/2004 | Harter | |
| 2005/0045586 A1 | 3/2005 | Ellin | |
| 2005/0225846 A1 | 10/2005 | Nati | |
| 2006/0000814 A1 | 1/2006 | Gu | |
| 2006/0017780 A1 | 1/2006 | Hara | |
| 2006/0103719 A1 | 5/2006 | Katzir | |
| 2006/0159137 A1 | 7/2006 | Shah | |
| 2006/0207976 A1 | 9/2006 | Bovatsek | |
| 2006/0263024 A1 | 11/2006 | Dong | |
| 2007/0012875 A1 | 1/2007 | Miyazawa | |
| 2007/0240325 A1 | 10/2007 | Pelsue | |
| 2008/0075326 A1 | 3/2008 | Otani | |
| 2010/0060965 A1 | 3/2010 | Oda | |
| 2010/0143744 A1 | 6/2010 | Gupta | |

FOREIGN PATENT DOCUMENTS

| | | |
|---|---|---|
| JP | 2002-273592 | 9/2002 |
| JP | 2004-532520 | 10/2004 |
| JP | 2004-306525 | 11/2004 |
| JP | 2007-229778 | 9/2007 |
| WO | WO 02/078896 | 10/2002 |
| WO | WO 2006/012124 | 2/2006 |
| WO | WO 2008/091898 | 7/2008 |

OTHER PUBLICATIONS

J.E. Carey et al., Visible and near-infrared responsivity of femtosecond-laser microstructured silicon photodiodes', Opt. Lett., vol. 30, No. 14, pp. 1773-1775, Jul. 15, 2005.

C.H. Crouch et al., "Comparison of structure and properties of femtosecond and nanosecond laser-structured silicon", Appl. Phys. Lett., vol. 84, No. 11, pp. 1850-1852, Mar. 15, 2004.

C.H. Crouch et al., "Infrared absorption by sulfur-doped silicon formed by femtosecond laser irradiation", Appl. Phys. A 79, pp. 1635-1641, published online Jun. 23, 2004.

M. Groenendijk et al., "Surface microstructuring and the influence of heat accumulation during femtosecond pulsed laser ablation," 4th International Conference on Laser Advanced Materials Processing LAMP 2006, pp. 1-5.

T.-H. Her et al., "Femtosecond laser-induced formation of spikes on silicon", Appl. Phys. A 70, pp. 383-385, published online Mar. 8, 2000.

T.-H. Her et al., "Microstructuring of silicon with femtosecond laser pulses", Appl. Phys. Lett. vol. 73, No. 12, pp. 1673-1675, Sep. 21, 1998.

L. Shah et al., "12 µJ, 1.2 W Femtosecond Pulse Generation at 346 nm from a Frequency-tripled Yb Cubicon Fiber Amplifier," CLEO 2005 Postdeadline, CPDB1, pp. 1-3, May 22, 2005.

A.Y. Vorobyev et al., "Colorizing metals with femtosecond laser pulses", Applied Physics Letters vol. 92, 04194, Jan. 31, 2008.

C. Wu et al., "Near-unity below-band-gap absorption by microstructured silicon", Appl. Phys. Lett. vol. 78, No. 13, pp. 1850-1852, Mar. 26, 2001.

C. Wu et al., "Visible luminescence from silicon surfaces microstructured in air", Appl. Phys. Lett. vol. 81, No. 11, pp. 1999-2001, Sep. 9, 2002.

R.J. Younjkin et al., "Infrared absorption by conical silicon microstructures made in a variety of background gases using femtosecond-laser pulses", J. Appl. Phys. vol. 93, No. 5, pp. 2626-2629, Mar. 1, 2003.

International Search Report and Written Opinion for Intn'l App. No. PCT/US2008/051713, dated May 23, 2008, in 16 pages.

International Preliminary Report on Patentability for Intn'l App. No. PCT/US2008/051713, dated Aug. 6, 2009, in 15 pages.

Translation of Office Action for Japanese Patent Application No. JP 2009-546579 issued on Jun. 28, 2013 in 6 pages.

* cited by examiner

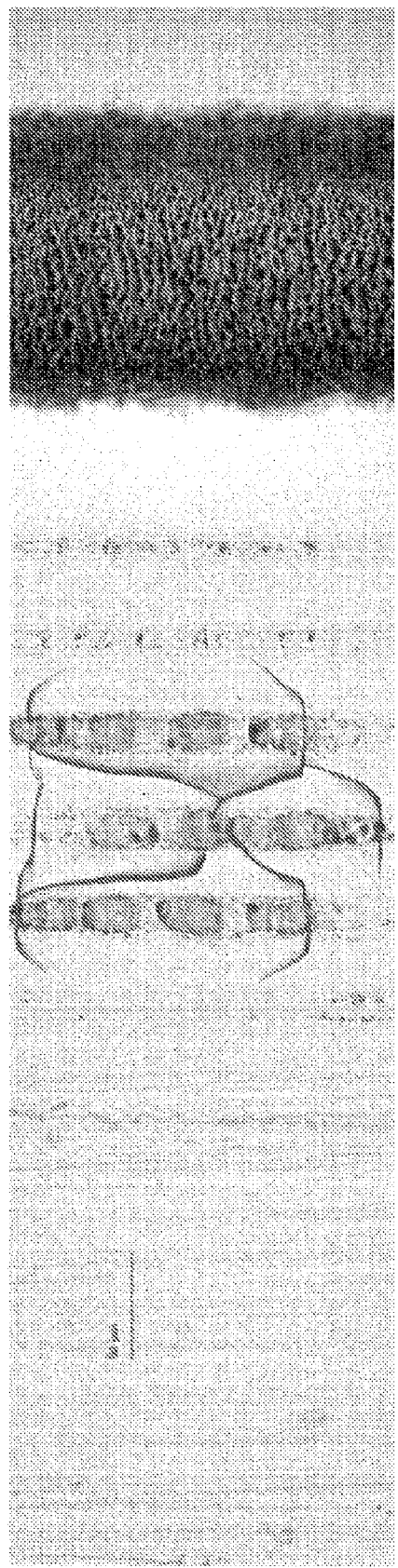

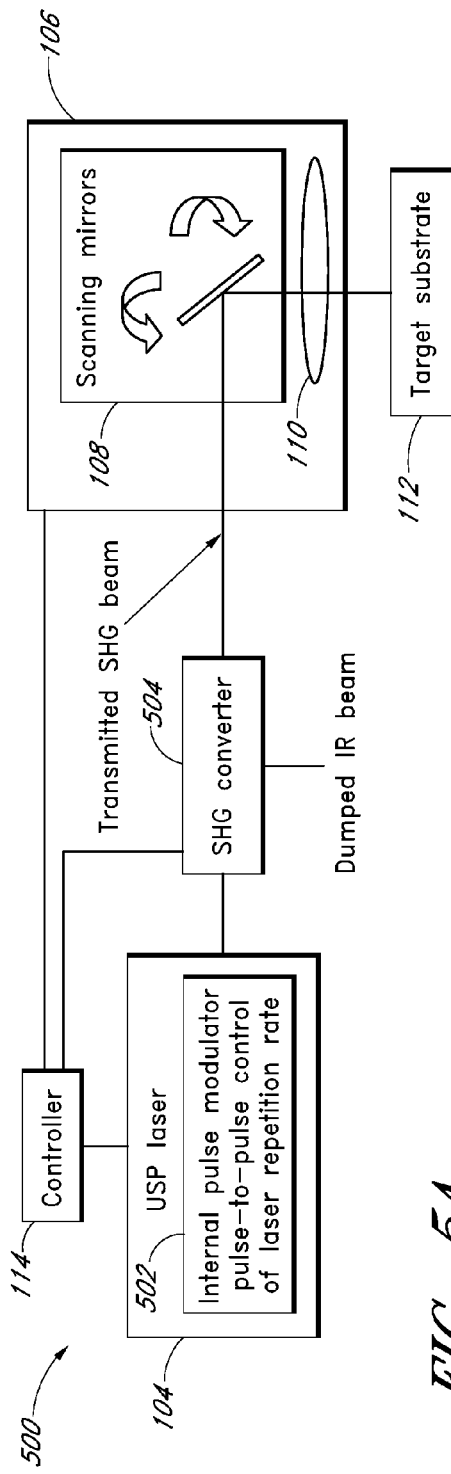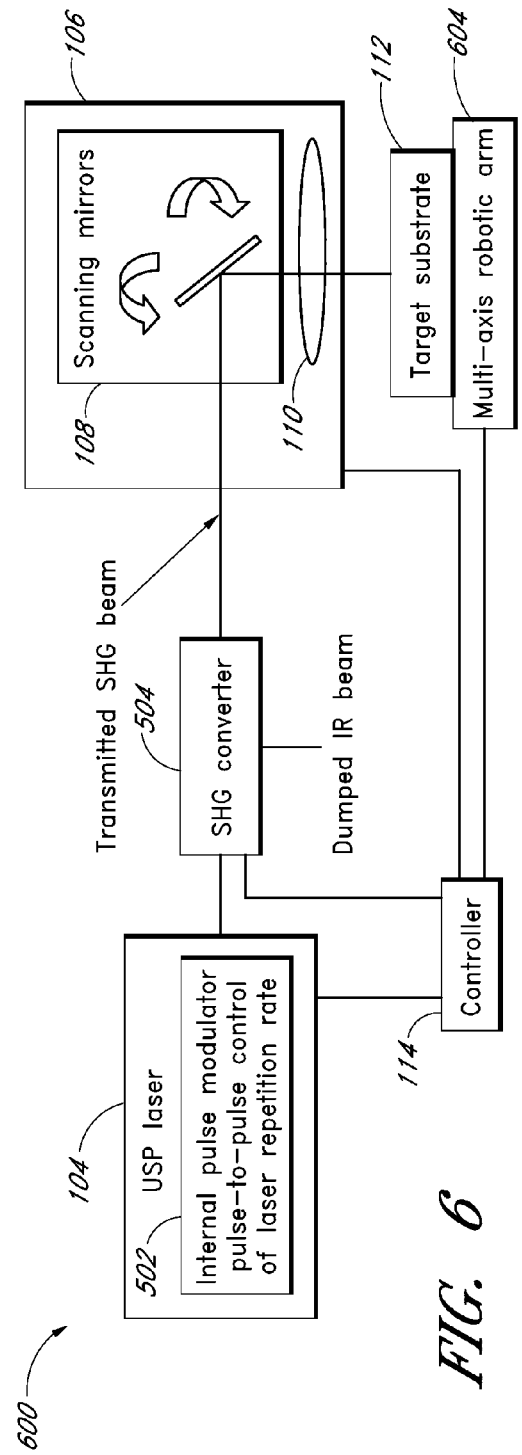
FIG. 5A
FIG. 6

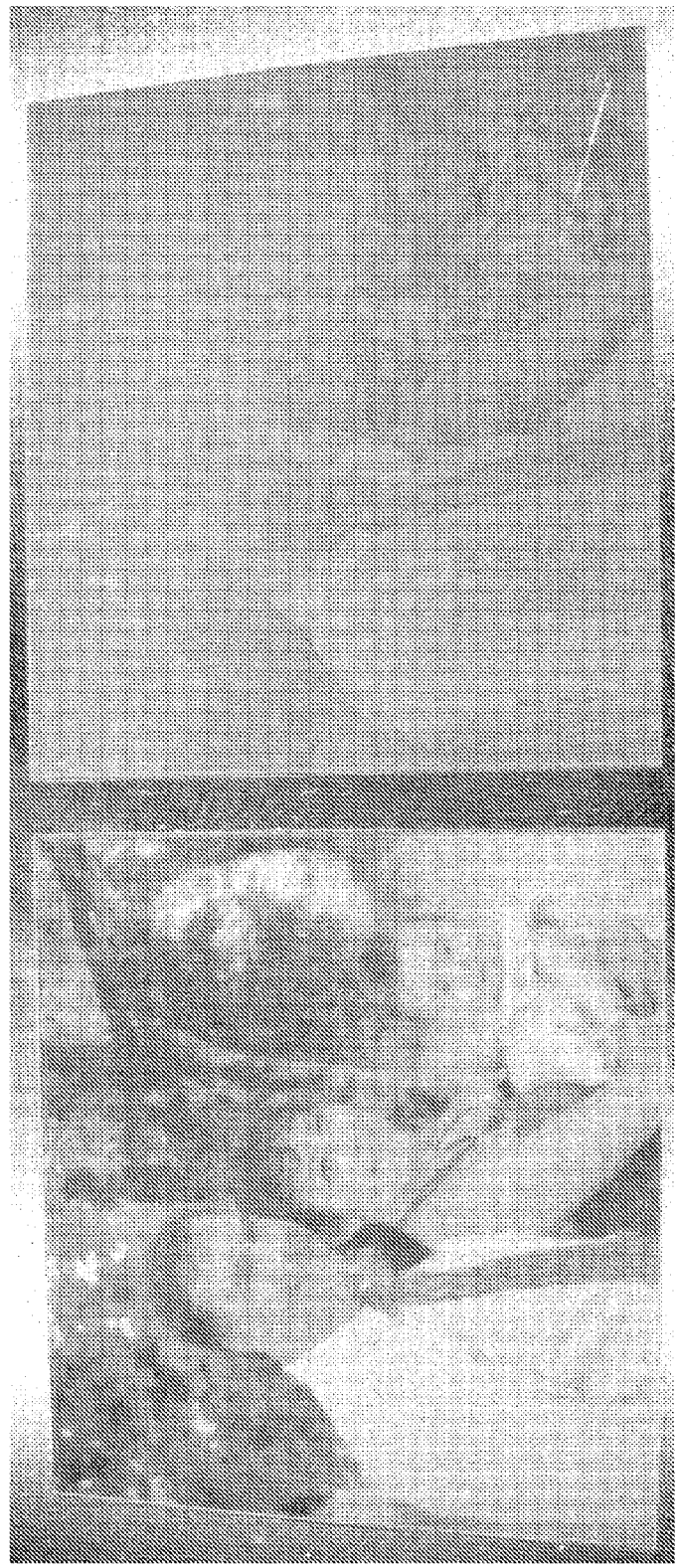

ULTRASHORT LASER MICRO-TEXTURE PRINTING

CROSS-REFERENCE TO RELATED APPLICATIONS

This application is a continuation of U.S. patent application Ser. No. 13/799,754, filed Mar. 13, 2013, entitled "ULTRASHORT LASER MICRO-TEXTURE PRINTING," now U.S. Pat. No. 8,670,151, which is a continuation of U.S. patent application Ser. No. 12/495,609, filed Jun. 30, 2009, entitled "ULTRASHORT LASER MICRO-TEXTURE PRINTING," now U.S. Pat. No. 8,405,885, which claims the benefit under 35 U.S.C. §120 and 35 U.S.C. §365(c) as a continuation of International Application PCT/US2008/051713 designating the United States, with an international filing date of Jan. 22, 2008, entitled "ULTRASHORT LASER MICRO-TEXTURE PRINTING," which claims the benefit under 35 U.S.C. §119(e) of U.S. Provisional Patent Application No. 60/886,285, filed Jan. 23, 2007, entitled "ULTRASHORT LASER MICRO-TEXTURE PRINTING;" each of the above-referenced applications and patent is hereby expressly incorporated by reference herein in its entirety.

BACKGROUND

1. Field

This disclosure relates to formation of textured regions on surfaces of materials by ultrashort optical pulses and to formation of images on materials. The disclosure also relates to techniques for optical modulation of ultrafast pulse trains.

2. Description of Related Art

In conventional ink printing, grayscales in images are generally created by using binary pixels of pre-defined size. For example, "on" may correspond to black and "off" may correspond to white. Grayscale may be produced by varying the density of "on" (e.g., black) pixels. As such, white images portions have few or no "on" pixels, black image portions have "on" pixels substantially covering the image portion, while gray image portions have varying densities of "on" pixels to achieve the desired grayscale. Thus, the image contrast is essentially determined by the number of gray levels, which is inherently determined by pixel size.

Pixels can be fabricated by a variety of methods. One method is ink-jet printing, where a jet of ink is deposited at various densities on a substrate. This method works very well for paper substrates but has limited utility for solid substrates such as metals. Generally, imaging techniques can be characterized as comprising the following actions: 1) digitizing an image; 2) creating a surface pattern; and 3) correlating the surface pattern with the digital image. In conventional ink-jet printing, 1) corresponds to calculation of the pixel density based on the grayscale of the image; 2) corresponds to deposition of the ink; and 3) corresponds to the density of ink-pixels on the image.

Lasers can be used to for patterning images on solid substrates. In conventional laser engraved grayscale images, image contrast is generally determined by machining depth. However, conventional laser engraving is very sensitive to laser irradiation parameters.

SUMMARY

Embodiments of apparatus and methods for producing texturing of substrates using ultrashort pulses (USP) are disclosed. Texturing includes patterning and structuring of the substrate and/or a surface of the substrate, and the terms texturing, patterning, and structuring are used interchangeably herein. In some of these embodiments, texturing may be used for image printing (or engraving) and/or for generation of grayscale images on arbitrary solid substrates.

Apparatus and methods are disclosed that utilize micro-structuring of materials and/or material surfaces for image engraving, where the micro-structures are produced with ultrafast pulse trains. In some embodiments, high-contrast and high-resolution grayscale images can be generated by variation of the accumulated laser fluence incident on a material surface. In one embodiment, laser irradiation conditions are varied in order to cause surface roughness variations, which may correspond to variations in light reflectance (e.g., diffraction and/or scattering) and/or light absorption. Light reflectance and/or absorption variations induced by surface micro-structuring provide for smooth variations of grayscales and enable production of images to be machined on the surface of a wide variety of materials.

The surface micro-structuring may produce surface roughness variations including, for example, holes, pits, scallops, grooves, trenches, peaks, craters, needles, cones, rods, bumps, or other surface features. The laser irradiation may be adjusted so that different regions of the surface have different surface roughness. For example, the density of surface features may be increased in regions where lower light reflectivity is desired. Alternatively or additionally, the laser irradiation may be adjusted to generate variations in the distribution of surface feature sizes, shapes, depths, or any other suitable property.

In some embodiments, high image contrast is provided by formation of relatively shallow features with controlled variations in surface roughness. Ultrashort laser pulses may be used to achieve controlled variations in surface roughness, because the ultrashort pulse duration provides deterministic thresholds for laser/material interaction. In some embodiments, the ultrashort pulses have a pulse width of less than about 10 ns. In other embodiments, the pulse width may be less than about 100 ps. In certain embodiments, the pulse width is less than about 10 ps.

Image processing and/or image formation via micro-texturing with longer pulse laser systems may not achieve some of the advantages provided with shorter pulse laser systems. For example, the longer pulse duration associated with some conventional lasers (e.g., >250 ps), may not provide control of surface roughness and may cause significant melting effects, which tend to destroy the fine textures achievable with shorter pulses.

Image printing to a reasonable size advantageously may utilize pulses with sufficient pulse energy (e.g., greater than about 10 µJ in some embodiments) to allow beam scanning. Some embodiments of imaging systems utilize relatively high pulse repetition rates and may use relatively high average powers to produce an image in a reasonable processing time.

Embodiments for image engraving are disclosed that provide surface texturing of virtually any substantially "flat" material. For example, the material may comprise a large bandgap dielectric, such as sapphire. The material may comprise a metal, a glass, a crystal, a plastic, a polymer, or other suitable solid substrate. Materials having material finishes obtained by conventional mechanical milling may be used for image engraving. In certain embodiments, the material does not have a polished finish. In certain embodiments using high average power ultrafast lasers, reasonably large macroscopic images can be engraved on reasonably large surface areas. The systems and methods disclosed herein may be used to substantially replicate images from, for example, photographs, pictures, paintings, drawings, portraits, illustrations, and/or any work of artistic expression. An image may include visual elements such as, for example, graphics and/or text. The disclosed systems and methods may be used for engraving images that include a likeness or representation of, for example, persons, animals, plants, natural structures, man-made structures, and so forth. The image engraving systems and methods described herein may advantageously enable new possibilities for generation of art-work. The disclosed embodiments may also allow individualization of mass products by engraving personal emblems on a wide variety of items such as car doors, windows, cell phones, computers, personal computing devices (e.g., PDAs, pocket PCs), portable music devices (e.g., iPods available from Apple, Inc., Cupertino, Calif.), etc. Such embodiments beneficially may be used to print or engrave information on products, manufactured articles, components, devices, and so forth. For example, such information may include identification and/or security information, instructions for use, warnings, logos, trademarks, personalizations, and/or any other type of information found on products or product packaging. In some embodiments, the system may be used to provide markings on surfaces of materials including, for example, semiconductors (e.g., silicon), metals (e.g., steel), and/or dielectrics (e.g., glass). Such embodiments may be useful in semiconductor manufacturing applications (e.g., fabrication of microelectromechanical systems (MEMS) devices) and/or in metrology applications.

Surface texturing for image engraving may be more difficult to perform in some organic materials (such as textiles and polymers), because they may tend to burn when machined using ~1 μm laser wavelengths even if femtosecond laser pulses are used. In certain embodiments, the burn problem may be overcome by the selection of appropriate irradiation wavelengths with widely different absorption characteristics. For example, images can be generated on polymers (or plastics) using ultrafast pulses with a wavelength of about 500 nm (e.g., "green" light). Generally, the irradiation wavelength can be varied so as to modify and/or improve or optimize image contrast and precision for any material.

In some implementations, after fabrication the fine structures associated with ultrashort pulse image engraving may be sensitive to contamination. For example, oil deposited by finger prints may be detrimental to the image. In some cases, contamination from finger prints, water deposits, dust, etc. can become lodged in the fine structures and may reduce the image quality. Accordingly, in certain embodiments image fixation is used to provide image protection. Such protection can be relatively easily achieved in certain such embodiments without significant loss of image quality by applying a coating such as, e.g., enamel, polymer, etc., after laser engraving the image. In an embodiment, the coating is substantially optically transmissive (or translucent) to light.

In some micro-textured images, the shallowest periodic or semi-periodic structures can function as grating-like structures. In certain embodiments, the grating-like structures may not be sufficiently regular for use in rigorous optical applications but these features may provide a visual effect which can be used in applications such as, for example, the printing of grayscale images, graphics, and/or text. In some implementations, these structures provide a "rainbow" effect such that the color of the surface appears to change relative to the angle of incident light and/or the point of view of an observer. Accordingly, certain embodiments of the disclosed image printing methods utilize these grating-like structures to introduce color effects to the resulting image. In one embodiment, grating-like structures can be obtained along a certain polarization direction by the use of linearly polarized light. In another embodiment, substantially omni-directional grating structures can be generated using circular polarized light. In another implementation, color effects can also be generated using radially polarized light. In certain embodiments, circularly or elliptically polarized light can be used to produce substantially linear grating-like structures on the substrate. In certain such embodiments, linear grating-like structures produced using circularly or elliptically polarized light are formed at an angle as compared to grating-like structures produced using linearly polarized light.

The grating-like structures have features with a spacing that is proportional to the wavelength $\lambda$ of the illuminating laser light. In certain embodiments, the spacing may be in a range from about $0.5\lambda$ to about $1.5\lambda$. In embodiments in which visible illumination light is used (e.g., $\lambda$ approximately 520 nm or 355 nm), the spacing of the features may be approximately less than or equal to wavelengths of visible light. The illumination wavelength may be adjusted to form grating-like structures that have desired properties including, e.g., "rainbow" like effects and/or colors when the surface is viewed in visible light.

In certain embodiments, the microstructures can be modified by changing the environment under which the irradiation takes place. For example, the environment may include the composition of the atmosphere (e.g., air or other suitable gas), the pressure and/or temperature of the atmosphere, etc. In some embodiments, the laser processing occurs in a substantial vacuum. In other implementations, other parameters that can be varied to affect the printed image grayscale and/or apparent color include some or all of the following (alone or in combination): exposure time, irradiation spot size, pulse length, pulse energy, pulse repetition rate, flux, fluence, intensity, and accumulated energy. Generally any change in a laser parameter can produce a usable change in an image property. Alternatively or additionally, properties of a beam scanning system may be changed to produce changes in image properties. For example, changes in scanning rate, dwell time, focal length, focal spot size, etc. may be used in certain embodiments.

In certain embodiments, an image, such as a gray scale image, is produced by varying the scanning rate of an ultrashort pulse laser beam relative to a target substrate. In regions of the target substrate where the scanning rate is relatively low, relatively more optical pulses will be incident on the region so that relatively more optical energy will be delivered to the region. In regions of the target substrate where the scanning rate is relatively high, relatively fewer optical pulses will be incident on the region so that relatively less optical energy will be delivered to the region. Accordingly, variations in the relative scanning rate of the laser beam and the target substrate may be used to provide variations in the optical energy delivered to different regions of the target substrate. The variations in the delivered optical energy produce variations in the microstructure texture of the different regions of the target substrate. In certain such embodiments, the variations in the microstructure texture cause variations in optical properties (e.g., reflection, absorption, diffraction, and/or scattering) of the target substrate. For example, variations in the optical energy delivered to different regions of the target substrate may be used to alter the reflectivity of the different regions so that an observer will see the image when the target substrate is illuminated by a light source (e.g., ambient light).

A variety of techniques and systems are disclosed that enable ultrashort pulse optical irradiation at fluences sufficient for micro-texturing and, in some embodiments, at sufficiently high average powers for rapid processing. Some example, non-limiting embodiments are described below.

In a first embodiment, an ultrafast fiber laser is used in conjunction with a galvanometric scanner and an F-theta lens for controlling the accumulated optical fluence on a target material. Grayscale images are obtained by a modulation of the scan speed of the laser relative to the target material in order to provide different amounts of optical energy to different regions of the target material In other embodiments, different types of lasers may be used such as, e.g., semiconductor lasers, solid state lasers, gas lasers, etc.

In a second embodiment, a fast optical shutter is introduced to enable the rapid modulation of high power femtosecond pulse trains. For example, the repetition rate of a pulse train injected into a high power and high gain fiber amplifier may be modulated prior to injection. In this embodiment, the modulation function may be accomplished on the low average power "seed" train, allowing the use of conventional optical devices without risk of damage to the optical modulator. The average output power after the high gain fiber amplifier may be proportional to the repetition rate of the injected pulse train (e.g., higher average power for high repetition rate), and the pulse energy may be inversely proportional to the pulse repetition rate (e.g., lower pulse energy for higher repetition rate). In some implementations, a nonlinear optical frequency conversion element is used, and the variation in frequency conversion is proportional to the amplified pulse energy and therefore inversely proportional to the amplified laser repetition rate. In certain embodiments, by directing only the frequency converted light to the target, the optical modulation allows for substantially instantaneous variation of the average power impinging onto the material to be processed, without affecting the gain and thermal conditions in the final fiber amplifier. In certain such embodiments, the variation in pulse energy and associated laser fluence on the target may be sufficient for surface texturing, even at the fundamental wavelength. Accordingly, even though the laser power reaching the target may be relatively high in a "laser off" condition, the laser fluence on the target may be low relative to the ablation and/or surface modification thresholds of the target material so that the target material is not substantially processed or modified by the laser beam.

In a third embodiment, the substrate is further positioned on a robotic arm for image printing. The robotic arm may permit the substrate to be translated, rotated, and/or re-oriented, and may advantageously enable images to be formed on non-flat objects.

In a fourth embodiment, the substrate is moved while the laser beam remains fixed. This embodiment advantageously provides much tighter focusing of the incident laser beam and subsequent reduction of the beam spot size. This embodiment may be well-suited for the production of small scale, yet still high resolution images, where the small image size requires fine control of the texture modulation.

In a fifth embodiment, a method for engraving an image onto a substrate or a substrate surface is provided, wherein the image is formed via micro-texturing of the substrate or the substrate surface area. The micro-texturing comprises random or semi-periodic microscopic surface features which modulate an optical property of the substrate or the substrate surface area.

In an aspect of the fifth embodiment, the modulation of the optical property of the substrate or the substrate surface area is due to a modulation of light reflection, light absorption, light scattering, light diffraction, or a combination of any of these three effects.

In an aspect of the fifth embodiment, the microscopic surface features have dimensions comparable to or smaller than the wavelength of light in the visible spectral range.

In an aspect of the fifth embodiment, the microscopic surface features have dimensions smaller than about 10-50 times the wavelength of light in the visible spectral range.

In an aspect of the fifth embodiment, the modulation of the reflective, absorptive, and/or diffractive properties of the substrate or the substrate surface area arises from a modulation of the average size and/or variation in the periodic (or semi-periodic) structure of the surface features.

In an aspect of the fifth embodiment, the surface features are induced with a train of ultrafast optical pulses.

In a sixth embodiment, a system for image engraving comprises a substrate, a source of a train of ultrafast optical pulses, and an optical scanning system. The pulse train has an optical emission wavelength. The substrate receives the ultrafast optical pulses via the optical scanning system, and the ultrafast optical pulses induce formation of micro-structures onto the substrate or the substrate surface. The micro-structures modulate the reflective, absorptive, and/or diffractive properties of the substrate surface.

In an aspect of the sixth embodiment, the ultrafast optical pulses have a pulse width less than about 100 ps.

In an aspect of the sixth embodiment, the ultrafast optical pulses have a pulse width less than about 10 ps.

In an aspect of the sixth embodiment, the image is capable of being formed via a modulation of the average pattern size of the micro-structures induced on the substrate surface.

In an aspect of the sixth embodiment, the optical scanning system is further configured to modulate the exposure time of the substrate or the substrate surface to the ultrafast pulse train.

In an aspect of the sixth embodiment, the optical scanning system comprises an optical scanner. The optical scanning system may comprise a galvanometric scanner.

In an aspect of the sixth embodiment, the optical scanning system comprises a movable robotic arm configured to move the substrate along at least a one-dimensional axis. The movable robotic arm may be configured to move the substrate in at least one tilting plane.

In an aspect of the sixth embodiment, the optical scanning system further comprises an optical modulator.

In an aspect of the sixth embodiment, the ultrafast pulse train is provided by an optical oscillator amplifier system. In certain aspects, the optical oscillator amplifier system further comprises an optical modulator between an oscillator and an amplifier. The optical modulator may be configured for a modulation of the pulse repetition rate injected into the amplifier, thereby modulating the pulse energy of the pulse train emitted at an output of the amplifier. In certain aspects, the system may also include a fiber amplifier. The fiber amplifier may be selected from a group consisting of a Yb, Er, Er/Yb, Tm, or Tm/Yb fiber amplifier.

In certain aspects of the sixth embodiment having an optical oscillator amplifier system, the system for image engraving further comprises a nonlinear frequency conversion crystal configured to produce a nonlinear frequency conversion efficiency to a frequency converted wavelength, which depends on the amplified pulse energy, thereby enhancing modulation of the average and peak power of the pulse train at a frequency converted wavelength.

In an aspect of the sixth embodiment, the source of the ultrafast pulse train is derived from a solid state laser.

In an aspect of the sixth embodiment, the micro-structures are capable of being modulated by a modulation of the polarization of the ultrafast pulse train.

In an aspect of the sixth embodiment, the micro-structures are capable of being modified by a control of the reactive or ambient atmosphere surrounding the substrate surface.

In an aspect of the sixth embodiment, the control of the micro-structures is adapted to provide for grayscales for the image.

In an aspect of the sixth embodiment, the control of the micro-structures is adapted to provide for color scales for the image. The color scales may result from wavelength-dependent diffractive, scattering, or absorptive effects at the micro-structures.

In an aspect of the sixth embodiment, the system further comprises means for image fixation. The image fixation means may comprise, for example, a film of polymer or enamel.

In an aspect of the sixth embodiment, the substrate is selected from a group consisting of metal, glass, ceramic, semiconductor, and polymer.

In an aspect of the sixth embodiment, the micro-structures are capable of being modified by a modulation of the emission wavelength.

In an aspect of the sixth embodiment, the micro-structures are capable of being modified by a modulation of the pulse intensity impinging onto the substrate or the substrate surface.

In a seventh embodiment, a method of image engraving is provided. The method comprises providing an image comprising a plurality of image regions, providing a substrate comprising a substrate surface, and directing a modulated train of ultrafast laser pulses onto the substrate. The modulated train of ultrafast laser pulses has a feature specific to each image region, and the laser pulses are capable of altering an optical property of each image region formed on the substrate or the substrate surface. The optical property may include reflection, absorption, scattering, diffraction, or a combination thereof.

In an aspect of the seventh embodiment, the pulse train feature comprises at least one of a pulse intensity, a pulse wavelength, a pulse train exposure time, a pulse polarization, and a reactive atmosphere adjacent the substrate surface.

In an eighth embodiment, a medium having a grayscale image therein is provided. The medium comprises a substrate having a surface and a plurality of regions on the surface. The regions have different texture that appears substantially similar to the grayscale image, such that when illuminated with light produce the image.

In an aspect of the eighth embodiment, the substrate comprises metal or semiconductor.

In an aspect of the eighth embodiment, the substrate comprises silicon.

In an aspect of the eighth embodiment, the substrate comprises crystal.

In an aspect of the eighth embodiment, the substrate comprises sapphire or diamond.

In an aspect of the eighth embodiment, the substrate comprises glass.

In an aspect of the eighth embodiment, the substrate comprises plastic or polymer.

In an aspect of the eighth embodiment, the substrate comprises a material that is substantially transparent or translucent in a range of visible wavelengths.

In an aspect of the eighth embodiment, the regions comprise holes or trenches.

In an aspect of the eighth embodiment, the regions have a width between about 100 nm and 1.5 microns.

In an aspect of the eighth embodiment, the regions comprise surface features having a depth of between about 100 nm and 100 microns.

In an aspect of the eighth embodiment, the texture has a surface roughness between about 5% and about 50% of the depth of the surface features.

In an aspect of the eighth embodiment, the texture comprises pits or peaks.

In an aspect of the eighth embodiment, the pits or peaks have a width between about 100 nm and about 50 microns.

In an aspect of the eighth embodiment, the pits or peaks have a height or depth of between about 100 nm and 100 microns.

In an aspect of the eighth embodiment, a difference in density of number of pits or peaks provides the difference in texture and grayscale.

In an aspect of the eighth embodiment, the region corresponds to an image pixel.

In an aspect of the eighth embodiment, the region corresponds to a bit map pixel.

In an aspect of the eighth embodiment, the grayscale includes at least 4 levels.

In an aspect of the eighth embodiment, the grayscale includes at least 8 levels.

In an aspect of the eighth embodiment, the grayscale includes at least 16 levels.

In an aspect of the eighth embodiment, the difference in texture produces different reflectivity to provide the different grayscale.

In an aspect of the eighth embodiment, the difference in texture has different absorption to provide the different grayscale.

In an aspect of the eighth embodiment, the difference in texture has different diffraction to provide the different grayscale.

In an aspect of the eighth embodiment, the grayscale image includes at least 1 million pixels.

In an aspect of the eighth embodiment, the grayscale image includes at least 10,000 pixels.

In an aspect of the eighth embodiment, the grayscale image formed in the medium has a spatial extent of about at least 100 microns by 100 microns.

In an aspect of the eighth embodiment, the grayscale image formed in the medium has a spatial extent of about at least 1 cm by 1 cm.

In an aspect of the eighth embodiment, the texture comprises grating-like structures.

In an aspect of the eighth embodiment, the texture comprises a plurality of periodic or semi-periodic structures that provide one or more colors when the medium is viewed in visible light. In some such aspects, these structures provide a "rainbow" effect such that the color of the surface appears to change relative to the angle of incident light and/or relative to the point of view of an observer.

In a ninth embodiment, a method of forming a grayscale image in a medium is disclosed. The method comprises providing a substrate having a surface and scanning a laser beam relative to the surface. The laser beam comprises a plurality of optical pulses having a pulse width of less than about 100 picoseconds. The method further comprises varying the total amount of optical energy delivered to different regions of the surface of the substrate, thereby altering the reflectivity of the regions to produce the grayscale image. In some aspects, the total delivered energy may be determined from a summation of the energy delivered by the optical pulses per unit area.

In an aspect of the ninth embodiment, variation in the total amount of optical energy delivered to different regions of the surface is provided by varying a scan speed of the laser beam relative to the surface, thereby causing variations in overlap of the optical pulses.

In an aspect of the ninth embodiment, the laser beam has a repetition rate greater than about 10 kHz.

In an aspect of the ninth embodiment, the laser beam has a repetition rate greater than about 100 kHz.

In an aspect of the ninth embodiment, the pulse width of the optical pulses is less than about 10 picoseconds.

In an aspect of the ninth embodiment, the pulse width of the optical pulses is less than about 1 picosecond.

In an aspect of the ninth embodiment, the optical pulses have an energy in a range of about 100 nJ to about 100 µJ.

In an aspect of the ninth embodiment, the optical pulses have an energy in a range of about 1 µJ to about 50 µJ.

In an aspect of the ninth embodiment, the method further comprises receiving a grayscale image file to be substantially replicated in the medium. The grayscale image may be imported via a network and/or may be provided from a storage medium.

In an aspect of the ninth embodiment, the method further comprises determining the optical energy delivered to produce the different grayscales of the grayscale image.

In an aspect of the ninth embodiment, the grayscale image comprise a two dimensional image.

In an aspect of the ninth embodiment, the grayscale image includes at least 1 million pixels.

In an aspect of the ninth embodiment, the grayscale image includes at least 10,000 pixels.

In an aspect of the ninth embodiment, the grayscale image includes at least 100 pixels.

In an aspect of the ninth embodiment, the grayscale image formed in the medium has a spatial extent of at least about 100 microns by about 100 microns.

In an aspect of the ninth embodiment, the grayscale image formed in the medium has a spatial extent of at least about 1 cm by about 1 cm.

In a tenth embodiment, a system of forming a grayscale image in a medium is disclosed. The system comprises a laser source configured to output a laser beam. The laser beam comprises a plurality of optical pulses having a pulse width of less than about 100 picoseconds. The system also includes a support for holding a substrate having a surface and a scanning system configured to scan the laser beam with respect to the surface of the substrate. The system also includes a controller configured to vary the total amount of optical energy delivered to different regions of the surface of the substrate based on the desired grayscale, thereby altering the reflectivity of the regions to produce the grayscale image. In certain aspects, the total amount of optical energy is determined by summing the energies of the optical pulses delivered to a region of the surface of the substrate.

In an aspect of the tenth embodiment, the laser source comprises a fiber laser.

In an aspect of the tenth embodiment, the laser source further comprises a modulator. The modulator may comprise an acousto-optic modulator.

In an aspect of the tenth embodiment, the laser source further comprises a second harmonic generation converter.

In an aspect of the tenth embodiment, the laser source further comprises a third order harmonic generation converter or a fourth order harmonic generation converter.

In an aspect of the tenth embodiment, the laser source further comprises an oscillator and an amplifier.

In an aspect of the tenth embodiment, the scanning system comprises a beam scanner and/or a translation system for translating the support holding the substrate.

In an aspect of the tenth embodiment, the controller is in communication with the scanning system so as to vary the rate of scanning.

In an aspect of the tenth embodiment, the controller is configured to vary the energy of the optical pulses.

In an aspect of the tenth embodiment, the controller is configured to vary the repetition rate of the optical pulses.

In an aspect of the tenth embodiment, the system further comprises an input configured to receive a data file corresponding to a grayscale image to be replicated in the medium. The input may comprise, for example, a network link and/or an input port configured to receive a storage medium.

In an eleventh embodiment, a medium having a grayscale image therein is disclosed. The medium comprises a substrate having a surface and a plurality of regions on the surface. The regions have different texture that provide different grayscale when illuminated with light so as to produce the image.

In an aspect of the eleventh embodiment, the substrate comprises metal or semiconductor.

In an aspect of the eleventh embodiment, the substrate comprises silicon.

In an aspect of the eleventh embodiment, the substrate comprises crystal.

In an aspect of the eleventh embodiment, the substrate comprises sapphire or diamond.

In an aspect of the eleventh embodiment, the substrate comprises glass.

In an aspect of the eleventh embodiment, the substrate comprises plastic or polymer.

In an aspect of the eleventh embodiment, the substrate comprises a material that is substantially transparent or translucent in a range of visible wavelengths.

In an aspect of the eleventh embodiment, the regions comprise holes or trenches.

In an aspect of the eleventh embodiment, the regions have a width between about 100 nm and 1.5 microns.

In an aspect of the eleventh embodiment, the regions comprise surface features having a depth of between about 100 nm and 100 microns.

In an aspect of the eleventh embodiment, the texture has a surface roughness between about 5% and about 50% of the depth of the surface features.

In an aspect of the eleventh embodiment, the texture comprises pits or peaks.

In an aspect of the eleventh embodiment, the pits or peaks have a width between about 100 nm and about 50 microns.

In an aspect of the eleventh embodiment, the pits or peaks have a height or depth of between about 100 nm and 100 microns.

In an aspect of the eleventh embodiment, a difference in density of number of pits or peaks provides the difference in texture and grayscale.

In an aspect of the eleventh embodiment, the region corresponds to an image pixel.

In an aspect of the eleventh embodiment, the region corresponds to a bit map pixel.

In an aspect of the eleventh embodiment, the grayscale includes at least 4 levels.

In an aspect of the eleventh embodiment, the grayscale includes at least 8 levels.

In an aspect of the eleventh embodiment, the grayscale includes at least 16 levels.

In an aspect of the eleventh embodiment, the difference in texture produces different reflectivity to provide the different grayscale.

In an aspect of the eleventh embodiment, the difference in texture has different absorption to provide the different grayscale.

In an aspect of the eleventh embodiment, the grayscale image includes at least 1 million pixels.

In an aspect of the eleventh embodiment, the grayscale image includes at least 10,000 pixels.

In an aspect of the eleventh embodiment, the grayscale image formed in the medium has a spatial extent of at least about 100 microns by about 100 microns.

In an aspect of the eleventh embodiment, the grayscale image formed in the medium has a spatial extent of at least about 1 cm by about 1 cm.

In an aspect of the eleventh embodiment, the texture comprises grating-like structures.

In an aspect of the eleventh embodiment, the texture comprises a plurality of periodic or semi-periodic structures that provide one or more colors when the medium is viewed in visible light. In some such aspects, these structures provide a "rainbow" effect such that the color of the surface appears to change relative to the angle of incident light and/or relative to the point of view of an observer.

In an aspect of the eleventh embodiment, the texture is generated by laser pulses having a wavelength $\lambda$. The regions may comprise surface features having a width in a range from about $0.5\lambda$ to about $1.5\lambda$. The regions may comprise a grating-like structure. The texture may comprise a periodic or semi-periodic array of surface features having a spacing in a range from about $0.5\lambda$ to about $1.5\lambda$. The texture may produce one or more colors when viewed in visible light. The texture may produce a rainbow.

In a twelfth embodiment, a method of forming a grayscale image in a medium is described. The method comprises providing a substrate having a surface, scanning a laser beam relative to the surface, and varying the optical energy delivered to different regions of the surface of the substrate, thereby altering at least one of reflectivity, absorptivity, and diffractivity of the regions to produce the grayscale image. The laser beam comprises a plurality of optical pulses having a pulse width less than about 100 picoseconds and delivers optical energy to the surface of the substrate. An observer may view the grayscale image when the medium is illuminated with light. An imaging system (e.g., a camera) may be used to record the grayscale image.

In a thirteenth embodiment, a system of forming a grayscale image in a medium is disclosed. The system comprises a laser source capable of outputting a laser beam comprising a plurality of optical pulses having a pulse width less than about 100 picoseconds. The system also comprises a support for holding a substrate having a surface and a scanning system configured to relatively scan the laser beam with respect to the surface of the substrate. The system further includes a controller configured to vary optical energy delivered by the laser beam to different regions of the surface of the substrate based on the desired grayscale in order to alter at least one of reflectivity, absorptivity, and diffractive properties of the regions to produce the grayscale image.

In a fourteenth embodiment, a method of forming a grayscale image on a substrate having a surface is disclosed. The method comprises scanning a first laser beam relative to the surface at a first scan speed. The first laser beam comprises a plurality of optical pulses having a first pulse width less than about 100 picoseconds. The first laser beam delivers first optical energy to an area of the surface of the substrate. The method further comprises varying the first optical energy delivered to different regions of the area by the first laser beam, thereby altering the reflectivity of the regions in the area to produce a first grayscale image having a first visibility. The method further comprises scanning a second laser beam relative to the surface at a second scan speed. The second scan speed is greater than the first scan speed. The second laser beam comprises a plurality of optical pulses having a second pulse width less than about 100 picoseconds and delivers second optical energy to at least a portion of the area scanned by the first laser beam. The method also includes varying the second optical energy delivered to different regions in the area, in order to produce a second grayscale image having a second visibility in which the second visibility is greater than the first visibility.

In a fifteenth embodiment, a method is disclosed for modifying a medium so that a grayscale image is obtainable from the medium. The method comprises providing a medium having a surface and scanning a laser beam relative to the surface. The laser beam comprises a plurality of optical pulses having a pulse width less than about 100 picoseconds, and the laser beam delivers optical energy to the surface of the medium. The method further comprises varying the optical energy delivered to different regions of the surface of the medium, thereby altering at least one of reflectivity, absorptivity, and diffractive properties of the regions to provide the grayscale image obtainable from the medium.

In a sixteenth embodiment, a system of modifying a medium so that a grayscale image is obtainable from the medium is described. The system comprises a laser source capable of outputting a laser beam comprising a plurality of optical pulses having a pulse width less than about 100 picoseconds, a support for holding a medium having a surface, and a scanning system configured to relatively scan the laser beam with respect to the surface of the medium. The system also includes a controller configured to vary optical energy delivered by the laser beam to different regions of the surface of the medium based on a desired grayscale, thereby altering at least one of reflectivity, absorptivity, and diffractivity of the regions to provide the grayscale image obtainable from the medium.

In a seventeenth embodiment, a method is disclosed for modifying a medium having a surface so that a grayscale image is obtainable from the medium. The method comprises scanning a first laser beam relative to the surface at a first scan speed. The first laser beam comprises a plurality of optical pulses having a first pulse width less than about 100 picoseconds, and the first laser beam delivers first optical energy to an area of the surface of the medium. The method further comprises varying the first optical energy delivered to different regions of the area by the first laser beam, thereby altering at least one of the reflectivity, absorptivity, and diffractive properties of the regions in the area to provide a first grayscale image obtainable from the medium. The first grayscale image has a first visibility. The method further comprises scanning a second laser beam relative to the surface at a second scan speed. The second scan speed is greater than the first scan speed. The second laser beam comprises a plurality of optical pulses having a second pulse width less than about 100 picoseconds, and the second laser beam delivers second optical energy to at least a portion of the area scanned by the first laser beam. The method further comprises varying the second optical energy delivered to different regions in the area, thereby providing a second grayscale image obtainable from the medium. The second grayscale image has a second visibility, and the second visibility is greater than the first visibility.

In an eighteenth embodiment, a method for producing a grayscale image in a medium is disclosed. The method comprises scanning a laser beam relative to a surface of the medium. The laser beam comprises a plurality of optical pulses having a pulse width less than about 100 picoseconds, and the laser beam delivers optical energy to the surface of the medium to produce the grayscale image.

In a nineteenth embodiment, a system for producing a grayscale image in a medium is disclosed. The system comprises a laser source capable of outputting a plurality of optical pulses having a pulse width less than about 100 picoseconds. The system also comprises a scanning system capable of relatively scanning the optical pulses and the medium to produce the grayscale image in the medium.

In various embodiments, a medium is provided such that an image is obtainable from the medium. The medium (or the surface of the medium) may be modified by any of the methods and systems disclosed herein. The image may be obtainable by illuminating the medium with light. The image may be a grayscale image having, for example, four, eight, sixteen, or more levels of gray. Portions of the image obtainable from the medium may display a "rainbow" effect in certain embodiments. An observer may view the image when the medium is illuminated with light such as, for example, visible light. An imaging system (e.g., a camera) may be used to record the image.

In other embodiments, a skilled artisan will recognize that various aspects, components, and features of the above-described embodiments may be used alone or in combination to provide desired substrate texturing properties.

BRIEF DESCRIPTION OF THE DRAWINGS

FIGS. 4A-4C show experimental results showing that structures can be machined into targets comprising aluminum (FIG. 4A, left), glass (FIG. 4B, center), and silicon (FIG. 4C, right), which establishes that the disclosed techniques are applicable to a wide variety of target materials. FIG. 4A includes a reference marker having a length of 50 μm.

FIG. 5A schematically illustrates a second embodiment of a system for the production of grayscale images using ultrafast pulse-induced surface texturing.

FIG. 6 schematically illustrates a fourth embodiment of a system for the production of grayscale images using ultrafast pulse-induced surface texturing.

FIGS. 8A and 8B show experimental results of a multiple-pass laser imaging technique. FIG. 8B is a photograph showing an image formed after an imaging pass, and FIG. 8A is a photograph showing the image after four cleaning passes.

DETAILED DESCRIPTION OF PREFERRED EMBODIMENTS

Figure 1:
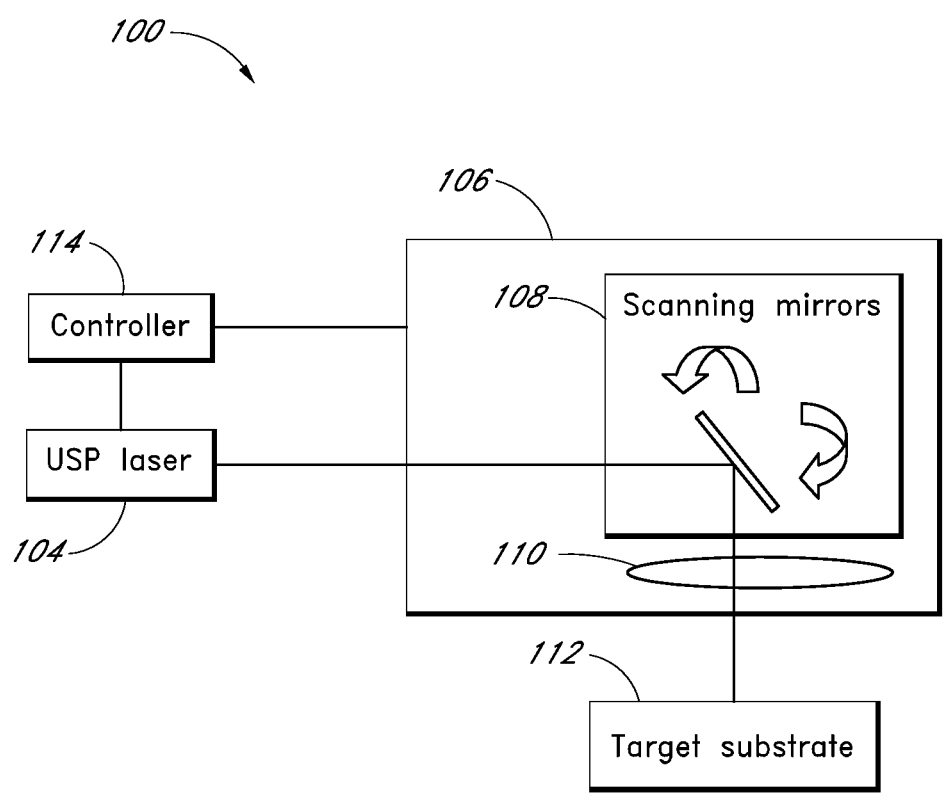
FIG. 1 schematically illustrates a first embodiment of a system for the production of images using ultrafast pulse induced surface texturing.

FIG. 1 schematically illustrates a first embodiment of a system 100 capable of use for image formation of a target substrate 112 via surface micro-structuring with ultrafast pulse trains. The system 100 comprises a laser system 104 and a scanning system 106. In this embodiment, the scanning system 106 includes two galvanometric scanning mirrors 108 capable of two-dimensional scanning. In other embodiments, a different number and/or type of scanning mirrors may be used. In some embodiments, the scanning may be one-dimensional. The scanning system 106 may also include focusing optics 110 such as, for example, an integrated F-theta lens capable of producing a substantially flat field of view at the target substrate 112. For example, in some embodiments, the F-theta lens is configured to produce a 20 μm laser focus spot with a substantially flat field of view over an area of about 8000 $mm^2$. The scanning system 106 (and/or other system components) may be controlled by a controller 114. For example, the controller 114 may include one or more general and/or special purpose computers, which may be remote and/or local to the system 100.

In the embodiment schematically illustrated in FIG. 1, the system 100 is capable of converting an electronic image file (e.g., a bitmap file) into a scanning routine which is machined into the target substrate 112. In other embodiments, additional optical elements may be utilized in the scanning system 106 (e.g., mirrors, lenses, gratings, spatial light modulators, etc.). A skilled artisan will recognize that an image to be engraved may be communicated to the system 100 via many methods including wired and/or wireless techniques. A desired image may be digitized and stored on a storage medium, which may be local and/or remote from the controller 114. The digitized image may comprise a plurality of pixels. The pixels may comprise a Cartesian (e.g., x-y) array of pixels, or the pixels may be organized in any other suitable structured or random array or grouping. A pixel may correspond to a particular grayscale level. Any suitable number of grayscale levels may be used including, for example, 2, 3, 4, 8, 16, 32, 64, 100, 128, 256, or more levels. In a preferred embodiment, sixteen levels of gray are used. In some embodiments, the digitized image is represented via a bitmap, a raster graphics array, or some other suitable digital file or structure. For example, a bitmap may correspond to a bitmap image format such as, for example, the Portable Network Graphics (PNG) format, the Graphics Interchange Format (GIF), or any other suitable format. The digitized image format may provide data compression. In certain embodiments, the image is represented via vector graphics including curves and/or polygons. Many variations are possible.

In some embodiments, the laser system 104 may output ultrashort pulses (USP). An ultrashort pulse may have a duration such as, for example, less than approximately 10 ps. The ultrashort pulses may be utilized to achieve the textured structure on the target substrate 112 that provides an improved (or a maximum) in image visibility and/or image contrast. In the example system 100 shown in FIG. 1, the laser system 104 comprises a fiber-based laser capable of generating an ultrafast pulse train. For example, the laser may comprise an FCPA μJewel laser available from IMRA America, Inc. (Ann Arbor, Mich.). The laser pulses have a wavelength that may be about 1 μm. In some embodiments, shorter wavelengths laser pulses are used such as, for example, green light pulses of about 520 nm wavelength. In other embodiments, any other laser system can be implemented. In certain embodiments, the laser system 104 may produce laser pulses with a pulse width less than about 10 ps. For example, the pulse width may be in a range from about 100 fs to about 1 ps. In other embodiments of the laser system 104, other pulse widths are used such as, for example, ≤10 ns, ≤1 ns, ≤100 ps, ≤1 ps, and/or ≤100 fs.

In the embodiment shown in FIG. 1, a relatively long focal length (~125 mm) is used to achieve the approximately 8000 mm$^2$ scanning area, and pulse energies of approximately greater than about 5 μJ are used to produce sufficient laser fluence (energy per area) on the target substrate 112. In other embodiments, different focal lengths can be used to print the same or different size scanning areas. In certain embodiments, the pulse energies are greater than about 1 μJ.

In some embodiments, a relatively high laser repetition rate is used to enable relatively rapid laser processing. For example, the repetition rate may be larger than about 100 kHz. In certain embodiments, a repetition rate of about 500 kHz may be used. Other repetition rates are possible. The use of a relatively high repetition rate may be advantageous because the micro-texture provided for improved or optimal image contrast is the accumulated result of many laser pulses. For example, in some implementations, hundreds of laser pulses may overlap in each 20 μm focal spot diameter. Another possible advantage of a relatively high repetition rate is the ability to form an image in a shorter time than when a lower repetition rate is used. In certain implementations, use of a higher repetition rate may result in reduced image quality. Accordingly, in certain such implementations, more precise scanning system controllers are used to provide higher quality images.

Figure 2A:
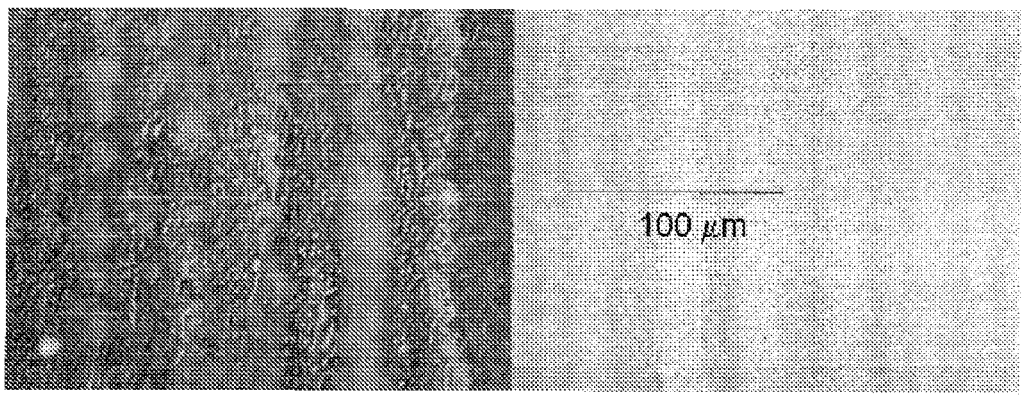
FIGS. 2A-2C illustrate experimental results showing the microscopic difference between "black" and "white" structures used in the formation of grayscale images as described herein. The incident laser fluence was substantially the same in the experiments shown in FIGS. 2A-2C, and the pulse duration increased from FIG. 2A (top) to FIG. 2C (bottom). The variation in the resulting surface structure as a function of incident laser pulse duration demonstrates that ultrashort pulse lasers are capable of producing significant and controllable variation in surface texture, thereby enabling high resolution and high contrast grayscale image engraving.
Figure 2B:
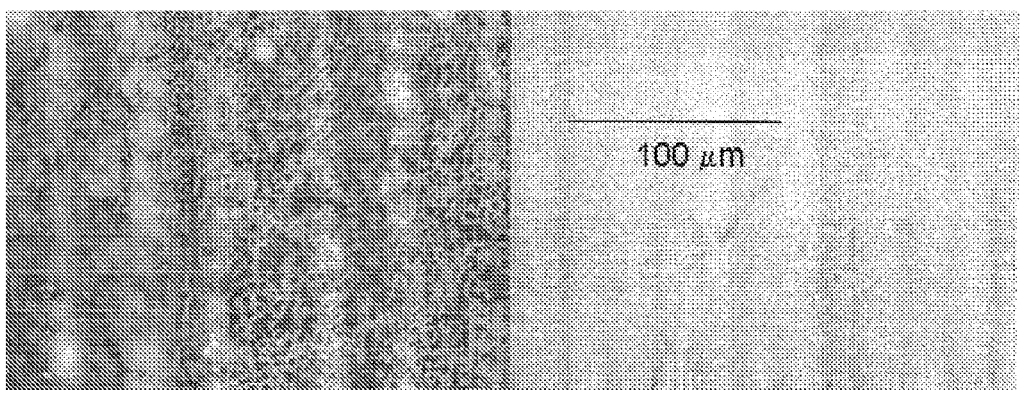
Figure 2C:
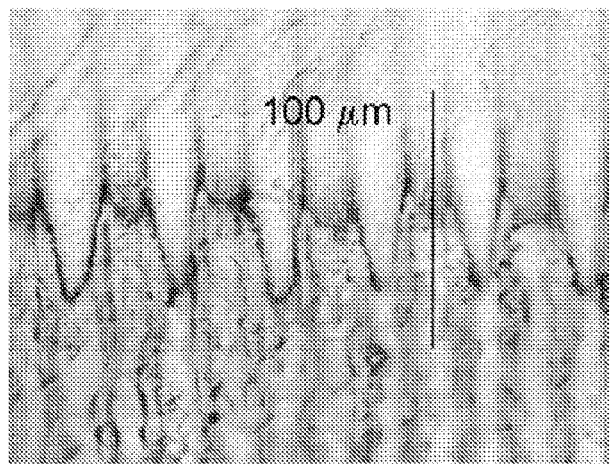

The embodiment schematically shown in FIG. 1 has been used in actual image formation, and some results are described with reference to FIGS. 2A-4C. For example, FIGS. 2A-2C are microscopic images showing surface morphology machined into steel by different laser pulse durations, under otherwise substantially identical laser irradiation (e.g., substantially identical fluences of about 4.75 J/cm$^2$). For reference, FIGS. 2A-2C include a reference marker having a length of 100 μm. In FIG. 2A, the pulse duration was about 600 fs, and the laser power density was about $8.0 \times 10^{12}$ W/cm$^2$. In FIG. 2B, the pulse duration was about 8.7 ps, and the laser power density was about $5.5 \times 10^{11}$ W/cm$^2$. In FIG. 2C, the pulse duration was about 400 ps, and the laser power density was about $1.2 \times 10^{10}$ W/cm$^2$. In these example images, the micro-structured feature depth is of the order of 10 μm for both femtosecond and picosecond irradiation shown in FIG. 2A (top) and FIG. 2B (middle), respectively. The feature depth shown in FIG. 2C (bottom) is about 5 μm for irradiation with 0.4 nanosecond pulses. Accordingly, the machined depth may be one factor for image contrast, but it is generally believed to be secondary to the effects of surface morphology.

Figures 3A, 3B:
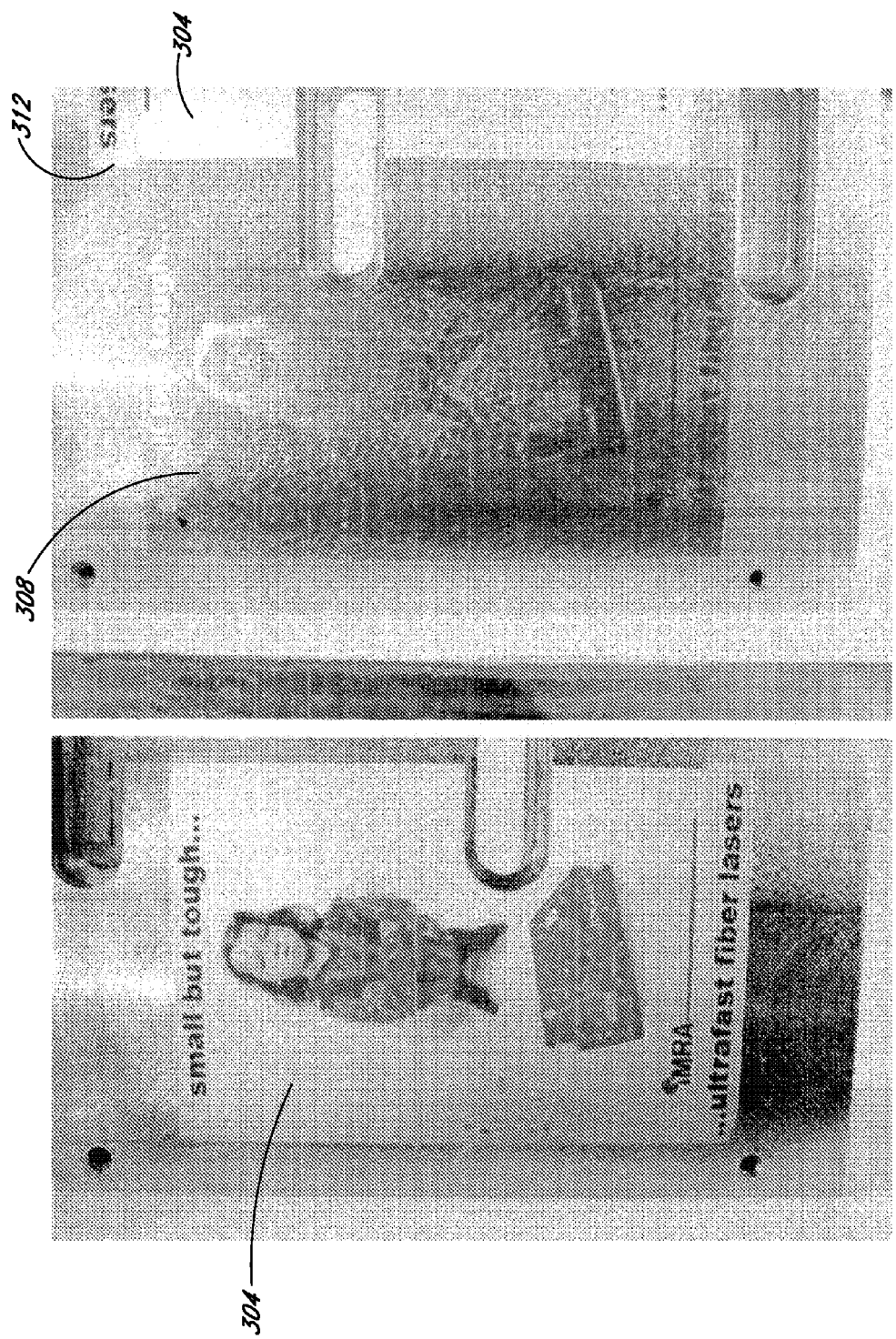
FIGS. 3A and 3B show experimental results showing the macroscopic difference in image quality for an image engraved using ultrashort laser pulses (FIG. 3A, left) as compared to an image engraved using non-ultrashort laser pulses (FIG. 3B, right). The image visibility and contrast is clearly much better for the case using ultrashort laser pulses. A rainbow-like color variation of the background in the ultrashort laser pulse case (FIG. 3A, left) is present.

Due to the difference in surface morphology, the visibility and contrast of an image may be significantly different when produced with ultrashort laser pulses as compared to longer pulses. FIGS. 3A and 3B are photographs showing an image 304 produced with ultrashort pulses (FIG. 3A on the left) and an image 308 produced with longer pulses (FIG. 3B on the right). Despite the uneven lighting, FIG. 3A shows the left image 304 machined using the ultrashort pulse laser is clearly visible, whereas FIG. 3B shows the image 308 on the right made with longer pulses has much less contrast, and the visibility depends highly on the lighting. The laser machined images 304, 308 have a size of about 75 mm×50 mm, and were photographed under identical conditions. The difference in visibility is particularly evident in the far right side of the image 308 shown in FIG. 3B where it is possible to see an edge 312 of the USP irradiated image 304 in the same frame as the image 308 fabricated with longer pulses. Furthermore, as the image 308 using longer pulses was printed after the image 304 using ultrashort pulses, it is possible to see where the texture created by the longer laser pulses "erased" the visibility of the ultrashort machined texture, demonstrating that visibility may be determined by the difference in texture and not by the difference in machined depth.

The images 304 and 308 shown in FIGS. 3A and 3B were machined in about 4.5 minutes using a fiber laser system operating at a pulse repetition rate of about 500 kHz. To produce the same image using a more conventional 1 kHz Ti:S laser would require about 40 hours. While conventional Ti:S lasers provide more laser energy, the higher energy would destroy the lateral and depth resolution required for this application. The combination of ultrashort pulse duration, sufficiently large (but not too large) pulse energy, and high laser repetition rate has only recently been achieved by laser technology. In some embodiments of the system, fiber lasers are used for providing suitable target illumination parameters. Advantages of fiber lasers include the robustness, stability, and high beam quality of ultrashort pulses produced by such lasers.

In various embodiments, the system 100 may include a laser system 104 that outputs a beam of ultrashort pulses with a wavelength of about 1040 nm. Other wavelengths may be used such as, for example, a frequency doubled wavelength of about 520 nm. In some embodiments, the ultrashort pulses may have pulse widths less than about 1 ps and a repetition rate between about 200 kHz and about 1000 kHz. The pulse energy may be in a range from about 5 μJ to about 25 μJ. The scanning system 106 may be configured to output on the target substrate 112 a focal spot having a diameter in a range from about 10 μm to about 30 μm. In some embodiments, the scanning system 106 is configured to provide an image resolution of about 1000 dots per inch (dpi) and an average scan speed relative to the target substrate 112 of about 100 mm/s to about 1000 mm/s. In other embodiments, the system 100 may be configured to provide different values of, for example, wavelength, pulse width, repetition rate, pulse energy, focal spot size, image resolution, and/or scan speed. Many variations are possible.

The formation of micro-textures and the production of images via material surface micro-structuring is possible on a wide variety of materials. For example, materials that have been machined include aluminum, glass, and silicon, and results have been substantially similar. FIGS. 4A-4C are photographs showing examples of the surface structure obtained in aluminum (FIG. 4A), glass (FIG. 4B), and silicon (FIG. 4C).

As described above, image fixation, can be readily implemented in certain embodiments. For example, a substantially clear, protective coating may be applied to the material after processing. The coating may comprise one or more coats of enamel and/or polymer. Other coatings may be used. In these embodiments, the visibility and image contrast may be preserved for substantially long times, and the machined material may be relatively insensitive to handling or environment.

FIG. 5A schematically illustrates an embodiment of a system 500 that can be used for image formation of a target substrate 112 via surface micro-structuring with ultrafast pulse trains. This system 500 may be generally similar to the embodiment schematically depicted in FIG. 1. The laser system 104 in the embodiment shown in FIG. 5A comprises an optional internal pulse modulator 502 not shown in the embodiment depicted in FIG. 1. The optical modulator 502 may be used for modulation of the repetition rate of the ultrashort pulse train. In some embodiments, the modulator 502 is adapted to change the laser pulse repetition rate from the oscillator repetition rate (typically about 50 MHz in some fiber laser embodiments) to the machining repetition rate (typically less than or about 1 MHz). For example, the modulator 502 may be configured to allow for transmission of only every nth pulse from the oscillator pulse train to a final power amplifier. In certain embodiments, it may be convenient to implement such oscillator amplifier configurations for the generation of high energy pulse trains, where for improved oscillator stability, oscillator repetition rates of the order of 50 MHz are utilized. Such oscillator amplifier systems are well known to a skilled artisan.

In certain implementations, the internal modulator 502 allows the average power and thermal conditions in the amplifier to remain substantially the same while substantially instantaneously changing the pulse energy and pulse peak power. The internal modulator 502 may comprise an acousto-optic modulator or any other suitable optical modulator. In certain embodiments, the laser system 104 outputs pulses with pulse energies above about 1 µJ, pulse durations less than about 10 ps, and a pulse repetition rate of greater than about 100 kHz.

The embodiment shown in FIG. 5A also comprises a frequency converter 504 such as, for example, a second harmonic generation (SHG) converter. In this embodiment, combination of the SHG converter and the internal modulator 502 provides a "fast shutter," because the harmonic conversion efficiency is proportional to the laser pulse energy. Accordingly, by modulating the laser repetition rate from the oscillator it is possible to turn the machining beam (e.g., the transmitted SHG beam) on and off substantially instantaneously. Such rapid shuttering is not possible mechanically and is difficult to implement optically for high laser powers without causing degradation to beam quality, pulse duration, etc. Some embodiments may include a third harmonic generation converter and/or a fourth harmonic generation converter or any other suitable harmonic generation converter.

The embodiment shown in FIG. 5A also comprises the controller 114, which may be used to control the laser system 104, the scanning system 106, the frequency converter 504, and/or other system components. For example, in certain embodiments, control of the modulator 502 and the scanning system 106 (e.g., the scanning minors 108 and/or the focusing optics 110) may be linked so as to enable much greater control of the laser irradiation conditions, thereby providing greater control of machining depth and lateral extent.

Figure 5B:
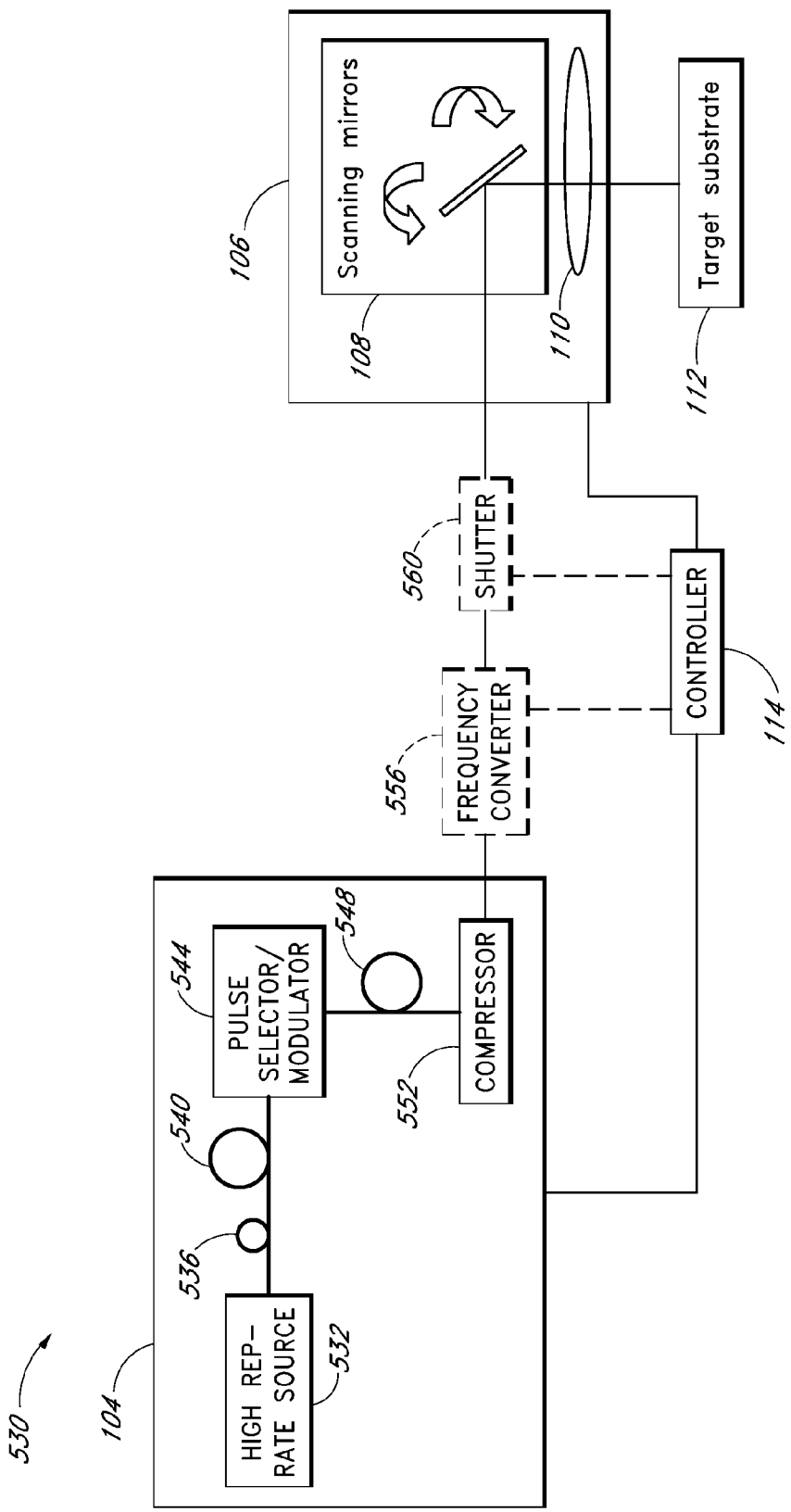
FIG. 5B schematically illustrates a third embodiment of a system for the production of grayscale images using ultrafast pulse-induced surface texturing.

FIG. 5B schematically illustrates an embodiment of a system 530 capable of use for image formation on a target substrate 112 via surface micro-structuring with ultrafast pulse trains. In this embodiment, the laser system 104 includes a chirped pulse amplification system such as, for example, a fiber-based chirped pulse amplification (FCPA) system. Advantages of using an FCPA system include improved efficiency and reliability. Also, since the output energy and peak-power of a fiber amplifier generally decrease as the repetition rate of the oscillator increases, the fiber amplifier output energy and power variation as a function of repetition rate may be exploited to provide improved FCPA performance.

Various U.S. patents assigned to the assignee of the present application disclose chirped pulse amplification systems using compact fiber configurations. The disclosure of each of the following U.S. patents is hereby incorporated by reference herein in their entirety: U.S. Pat. No. 5,499,134, issued Mar. 12, 1996 to Galvanauskas, et al., entitled "Optical Pulse Amplification Using Chirped Bragg Gratings," U.S. Pat. No. 5,696,782, issued Dec. 9, 1997 to Harter, et al., entitled "High Power Fiber Chirped Pulse Amplification Systems Based On Cladding Pumped Rare-Earth Doped Fibers," and U.S. Pat. No. 7,113,327, issued Sep. 26, 2006 to Gu, et al., entitled "High Power Fiber Chirped Pulse Amplification System Utilizing Telecom-Type Components" (hereinafter referred to as "the '327 patent"). Any of the laser systems disclosed in these patents, as well as other commercially-available "all fiber" laser systems, may be used with the system 530 shown in FIG. 5B.

In certain embodiments, the laser system 104 comprises an FCPA µJewel laser (available from IMRA America, Inc., the assignee of the present application), which provides laser pulses at an output of a compressor 552. The output pulses may be generated at an adjustable repetition rate up to about 1 MHz. An output pulse may have an energy of about 1 µJ or higher, and a pulse width about 1 ps or shorter. In some embodiments, if the peak power and pulse energy are low enough to avoid non-linear effects, a fiber compressor, rather than a bulk output compressor, may be used for pulse compression. In certain embodiments, photonic bandgap fibers or photonic crystal fibers may be used alone or in combination with bulk compressors or large area fibers to provide for increased output energy and peak power.

In the embodiment of the system 530 schematically illustrated in FIG. 5B, the laser system 104 comprises a single-pass fiber-based chirped pulse amplification system. The laser system 104 includes a high repetition rate source 532, a fiber stretcher 536, a fiber pre-amplifier 540, a pulse selector/modulator 544, a fiber power amplifier 548, and a compressor 552. The output of the compressor 552 may be an ultrashort pulse train. In some embodiments, the laser system 104 may include a double-pass pre-amplifier, stretcher, and power-amplifier arrangement (not shown), which may provide longer stretched pulse widths and higher gain in a comparable package size. As described above, the controller 114 may be configured to coordinate delivery of the pulses to the target substrate 112 via the scanning system 106. In various embodiments, the controller 114 may be used to control some or all of the components of the laser system 104, the scanning system 106, and/or other system components. In one embodiment, the controller 114 is configured to control the laser system 104 by controlling the pulse selector/modulator 544. As described above, the scanning system 106 may include, for example, a scanning mirror 108 such as, e.g., a galvanometer scanning mirror. The scanning system 106 may also include focusing optics 110.

The high repetition rate source 532 may provide a free-running pulse train operating at a repetition rate well above 1 MHz, for example, in a range of about 20 MHz to about 100 MHz. Mode-locked lasers, including all-fiber-based passive mode-locked or other devices, may be used to produce such repetition rates. Corresponding pulse widths may be in a range from about several hundred femtoseconds to about 10 picoseconds, for example. In other embodiments, non-mode locked laser sources may be used. For example, output of a quasi-CW semiconductor laser may be modulated and optionally compressed to produce picosecond or femtosecond pulses. Suitable laser sources include the sources described in U.S. patent application Ser. No. 10/437,057 to Harter, entitled "Inexpensive Variable Rep-Rate Source For High-Energy, Ultrafast Lasers," now U.S. Patent Application Publication 2004/0240037, assigned to the assignee of the present application, and hereby incorporated by reference herein in its entirety.

The fiber stretcher 536 may include a length of optical fiber (e.g., about 100 meters) to stretch pulses from the high repetition rate source 532 in order to avoid non-linear effects and/or damage to the fiber pre-amplifier 540 and/or the fiber power amplifier 544. The stretcher 536 may comprise a fiber Bragg grating (FBG), a chirped FBG, or a combination thereof. The stretcher 536 may comprise fiber having anomalous third order dispersion (TOD), so as to partially compensate residual TOD (if present) that may be accumulated in the system. In some embodiments, the majority of residual TOD results from the use of mismatched stretcher (fiber-based) and compressor dispersion (bulk-grating based). In various example embodiments, the width of a stretched pulse may be about 50 ps, in a range from about 100 ps to about 500 ps, or in a range up to about 1 ns. Pulse stretching may also be provided in double pass arrangements.

The fiber pre-amplifier 540, which is optional in some laser systems 104, amplifies the energy of a pulse emitted from the high repetition rate source 532. The source 532 may emit pulses with energies from about several hundred µJ to about 1 nJ. In some embodiments, the pulse energy at the output of the pre-amplifier 540 may be above about 1 nJ, for example, in a range from about 1 nJ to about 20 nJ.

The pulse selector/modulator 544 may be configured to selectively transmit pulses to the power amplifier 548. The pulse selector/modulator 544 may include an acoustic-optic modulator (AOM), an electro-optic modulator (EOM), a high speed Mach-Zehnder device (MZ), and/or an electro-absorption modulator (EAM). AOMs do not require high voltage electronics, and commercially available digital driver electronics provide ease of use. Mach-Zehnder modulators (MZs) are integrated optical devices having GHz bandwidths and low drive voltages, and in many cases, require a polarized input beam. In some embodiments, the relatively small area of an integrated MZ device may limit useable peak-power. In some embodiments, the pulse stretcher 536 reduces peak power incident on the modulator 544, as described in the '327 patent. MZ devices have been used at 1.55 µm telecom wavelengths, and MZ devices are now available at 1 µm wavelengths. The '327 patent discloses a chirped pulse amplification system using MZ modulators. In certain embodiments, the pulse selector/modulator 544 may provide for about 20 dB to about 30 dB of intensity control, and may be useable to at least partially control output intensity based on the transfer characteristic of the power amplifier 548 as a function of input.

In certain embodiments, the fiber power amplifier 548 comprises a multimode fiber amplifier configured to provide an output substantially in the fundamental mode. For example, the system may utilize a fiber power amplifier as described in U.S. Pat. No. 5,818,630, issued to Fermann, et al., entitled "Single-Mode Amplifiers and Compressors Based on Multi-Mode Fibers," assigned to the assignee of the present application, and hereby incorporated by reference herein in its entirety. Multimode fiber amplifiers provide production of peak powers and pulse energies that are higher than those achievable in single-mode (SM) fibers before the onset of undesirable nonlinearities and gain saturation. In other embodiments, large-area amplifiers may be utilized, for example photonic bandgap or photonic crystal designs. High quality output beams were demonstrated with leakage mode designs, for example, as described in U.S. patent application Ser. No. 11/134,856, entitled, "Single Mode Propagation in Fibers and Rods with Large Leakage Channels," published as U.S. Patent Application Publication 2006/0263024, assigned to the assignee of the present invention, and hereby incorporated by reference herein in its entirety.

As described above, the compressor 552 is an all-fiber compressor in some embodiments. However, if peak power is too high, for example about 100 kW or greater in some implementations, non-linear effects may limit performance of an all-fiber compressor. A tradeoff may then exist between the compactness of a fiber design and the flexibility associated with a bulk compressor. In some embodiments, both fiber and bulk components may be used in the laser system 104.

The high repetition rate source 532 may produce pulses having an output wavelength of about 1 µm. In some embodiments, the system 530 comprises an optional frequency converter 556. For example, the frequency converter 556 may comprise a frequency doubler, a frequency tripler, and/or a frequency quadrupler producing respective visible (e.g., green) or ultraviolet output wavelengths (for 1 µm input wavelengths). In some embodiments the frequency converter 556 may comprise a parametric amplifier. Conversion efficiency is generally improved with higher peak intensity. Therefore, the frequency converter 556 advantageously may be positioned to receive the output of the compressor 552. In one example embodiment, the frequency converter 556 was configured to provide second, third, and fourth harmonic generation. Second harmonic generation was accomplished using a type I non-critically phase-matched lithium triborate (LBO) crystal. The third harmonic was produced by sum frequency mixing the fundamental and the second harmonic in a type II critically phase-matched LBO crystal. A type I critically phase-matched beta barium borate (BBO) crystal generated the fourth harmonic by frequency doubling the second harmonic light. In this example embodiment, light having 50 µJ, 500 fs pulses at a fundamental wavelength of 1040 nm was input to the frequency converter 556, which provided 53%, 25%, and 10% conversion efficiency to second, third, and fourth harmonic frequencies, respectively. At a laser repetition rate of 100 kHz, this example embodiment produced an average power of about 5.00 W at 1040 nm, and average converted powers of about 2.62 W at 520 nm, about 1.20 W at 346 nm, and about 504 mW at 260 nm. The converted pulse energies were about 26 µJ at 520 nm, about 12 µJ at 346 nm, and about 5 µJ at 260 nm. Further details of a laser system 104 that may be used for providing frequency converted ultrashort pulses are described in "12 µJ, 1.2 W Femtosecond Pulse Generation at 346 nm from a Frequency-tripled Yb Cubicon Fiber Amplifier," by Shah, et al., 2005, CLEO 2005 Postdeadline, CPDB 1, which is hereby incorporated by reference herein in its entirety.

The controller 114 may be used to coordinates the positioning of the scanning beam and the selection of laser pulses. In certain embodiments, when the high repetition rate source 532 is free-running, a portion of the beam is detected using a length of optical fiber coupled to a high speed photodetector (not shown). The photodetector output provides a synchronization signal to the controller 114. The synchronization signal advantageously may be a digital signal. The scanning system 106 may include 2-D galvanometer mirrors 108 such as, for example, hurrySCAN® II 14 scan heads available from SCANLAB America, Inc. (Naperville, Ill.). Advantages of using such scan heads include that they are low inertia-devices and are provided with user-friendly commercially available controllers so that mirror position and/or velocity signals are readily programmable. The scanning system 106 and the controller 114 may also be used with any suitable combination of translation stages, rotation stages, and robotic arm (not shown) to position the target substrate 112. In some embodiments the scanning mirrors 108 may be omitted and any other suitable system for relatively moving the laser beam and the target substrate 112. Suitable focusing optics 110 such as, for example, an F-theta lens and/or a high resolution objective may be used to focus each ultrashort pulse onto the surface of the target material. Because some refractive optical elements may introduce spot placement and focusing errors resulting from material dispersion, in certain embodiments, commercially available optic elements designed for ultrashort laser pulse beams are used.

In certain embodiments, it may be desirable to operate the amplifier(s) substantially continuously to reduce the likelihood of damage and to provide for maximum energy extraction from the amplifiers. Fiber amplifiers are well suited for amplifying high speed pulse trains. However, in some embodiments, increased risk of amplifier damage occurs and undesirable amplified spontaneous emission (ASE) is generated during extended periods where material processing does not occur ("idle periods"). For example, in some amplifiers, the idle time period may be in a range from tens of microseconds to hundreds of milliseconds or greater. In certain fiber amplifiers, an idle time of about 100 μs may be sufficient for gain to increase to a sufficient level for free-lasing under high gain (strong pumping) conditions. After about 40 μs of idle time, if a seed pulse is injected, the built up gain in the amplifier may have sufficient gain to create a high energy pulse capable of inducing damage to the output fiber facet. Accordingly, in certain embodiments, stabilization and protection of the laser components is provided by dynamic adjustment of the input pulse energy and/or control of a pump diode current as described, for example, in U.S. patent application Ser. No. 10/813,173, to Nati, et al., entitled "Method And Apparatus For Controlling And Protecting Pulsed High Power Fiber Amplifier Systems," published as U.S. Patent Application Publication No. 2005/0225846, assigned to the assignee of the present application, and hereby incorporated by reference herein in its entirety.

In various embodiments of the system 530, the controller 114 can be configured to operate the pulse selector/modulator 544 at a high repetition rate (e.g., from about 50 MHz to about 100 MHz) during idle periods. During idle periods, the amplifier 548 is generally operating in a non-saturated regime. The power amplifier average output may slightly increase at the fundamental wavelength. Modulation of the pulse energy between an idle period and an "active" period (when the system 530 is processing the target) may be sufficient to provide rapid shuttering of the beam (e.g., "off" and "on" functionality). In some implementations, the laser fluence on the target substrate 112 during some "idle" periods may be above the ablation and/or surface modification thresholds, but the modulation in fluence between "idle" and "active" periods may be sufficient for process control. In some embodiments, an optional shutter 560 may be used to control the energy incident on the target substrate 112. The optional shutter 560 may comprise an acousto-optic device, an opto-mechanical shutter, and/or an electro-optic shutter.

Certain embodiments of the system 530 include a frequency converter 556 that may provide, for example, frequency doubling and/or tripling. In certain such embodiments, the pulse energy and/or the peak power may be relatively low at the output of the frequency converter 556. In such cases, output of the converter 556 may be a relatively low energy pulse with most energy content at the fundamental wavelength and, at focus on the target, the energy may be below the ablation and/or surface modification thresholds of the target material. In some system embodiments, modulator adjustment of about 20 dB to about 30 dB may provide control of intensity over a wide operating range so as to avoid altering target material properties.

In certain embodiments, techniques may be used to attenuate unwanted beam energy. For example, unwanted energy may be removed with a spectral filter (not shown). In some implementations, polarization filtering may be possible, because of the difference in polarization state between fundamental and harmonic frequencies for Type I phase matching. The pulse selector/modulator 544 also may be controlled to limit the energy to the amplifier 548. Focusing optics in the scanning system 106 (or other focusing optics if a scanner is not used) may be optimized for the machining wavelength (which may be a frequency converted wavelength if the optional frequency converter 556 is used). In some implementations, the focusing optics may be configured so that the spot size of the fundamental wavelength is increased so that the energy density at the surface of the target substrate 112 is reduced.

During active processing periods, the controller 114 may be used to provide signals to the pulse selector/modulator 544 to "down count" or otherwise select pulses. In some embodiments, processing repetition rates may be from about 100 KHz to about 10 MHz. During active processing, it may be advantageous for the laser to operate in saturation, or approximately so, in order to extract the maximum energy from the fiber amplifier.

FIG. 6 schematically illustrates an embodiment of a system 600 capable of use for image formation on a target substrate 112 via surface micro-structuring with ultrafast pulse trains. This system 600 may be generally similar to the embodiments depicted in FIGS. 1 and 5. The system 600 may further comprise a robotic arm system 604 coupled to the target substrate 112 and configured to manipulate the target position (and/or orientation) relative to the scanning beam. The robotic arm system 604 may be a single-axis or a multi-axis system. In some embodiments, the scanning system 106 comprises a scan head that is moved with respect to the target substrate 112. A possible advantage of embodiments providing relative movement between the scan beam and the target substrate 112 is that the system may enable processing of non-flat surfaces.

In the embodiments of the systems 100, 500, and 600 schematically shown in FIGS. 1, 5, and 6, respectively, the laser spot size is primarily determined by the F-theta lens in the scanning system 106. In some implementations, in order to have reasonable processing area for images, spot sizes larger than about 10 μm are used. Certain embodiments of the ultrashort pulse laser 104 are capable of machining much smaller spot sizes (e.g., ≤1 μm). For such small focal dimensions, significantly lower pulse energy is used in some embodiments. In order to achieve sufficiently high resolution over a sufficiently large working area, the target and the beam may be moved with respect to each other. For example, the target may be moved relative to a substantially stationary laser beam (or vice-versa).

In certain embodiments of the systems 100, 500, and 600, a variable telescope can be positioned along an optical path between the laser system 104 and the scanning system 106. In certain such embodiments, the F-theta lens may be omitted from the scanning system 106. The variable telescope may be used to dynamically vary the focal length of the system and may provide continuous variation of the focal spot size on the target substrate 112. A commercially available variable telescope system may include, for example, the varioSCAN dynamic focusing unit available from SCANLAB America, Inc. (Naperville, Ill.).

Figure 7:
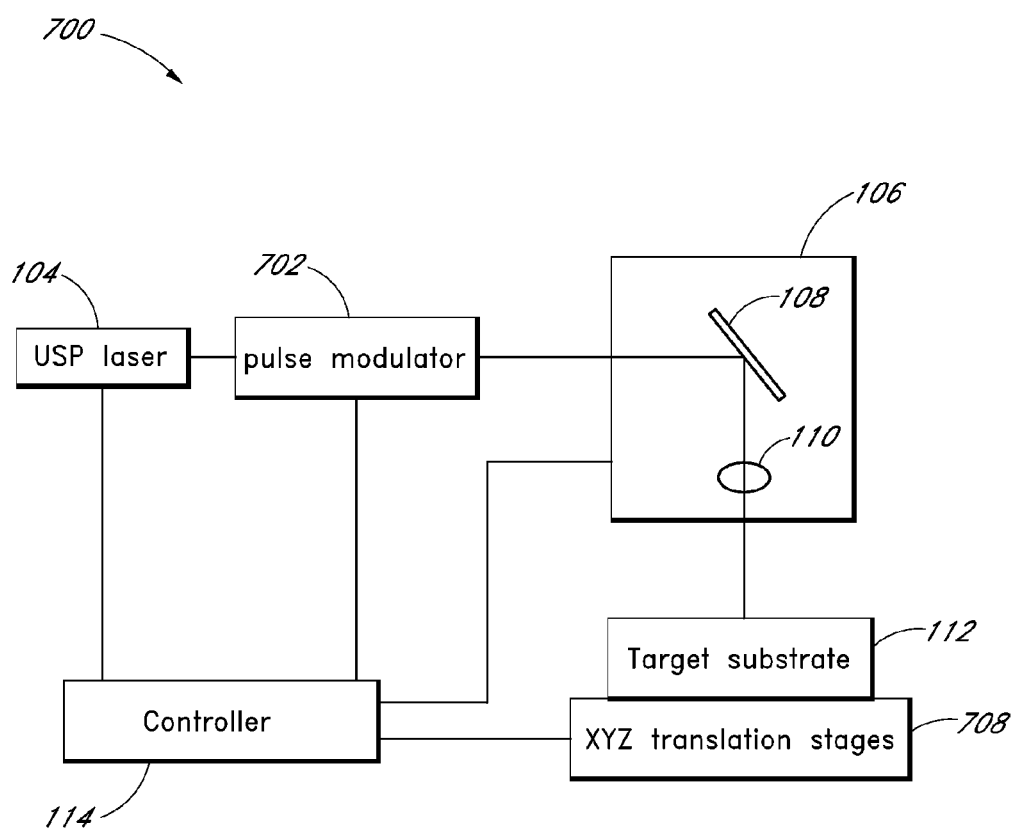
FIG. 7 schematically illustrates a fifth embodiment of a system for the production of grayscale images using ultrafast pulse-induced surface texturing.

FIG. 7 schematically illustrates an embodiment of a system 700 capable of use for image formation on a target substrate 112 via surface micro-structuring with ultrafast pulse trains. This embodiment comprises a laser system 104 and a translation stage 708 configured to move the target substrate 112 relative to the laser beam. In certain embodiments, the translation stage 708 remains in substantially constant motion with relatively high translation speeds in order to enable sufficiently high processing speeds. In some embodiments, the translation stage 708 may include an X-Y or an X-Y-Z translation stage. For example, the translation stage 708 may include a Nano-Translation (ANT™) stage available from Aerotech, Inc. (Pittsburgh, Pa.). Many techniques for relatively controlling positioning of a pulsed laser beam and a target substrate are known such as, for example, as described in U.S. Pat. No. 6,172,325 to Baird, et al., entitled "Laser Processing Power Output Stabilization Apparatus and Method Employing Processing Position Feedback." In some embodiments, the controller 114 may execute control instructions for coordinating the scanning system 106 and the translation stage 708 such as, for example, the Nmark™ control software available from Aerotech, Inc. (Pittsburgh, Pa.).

In some embodiments of the system 700 schematically shown in FIG. 7, a modulator 702 may be used to provide substantially instantaneous laser modulation for improved control of the surface texturing. The modulator 702 may be generally similar to the modulator 502 described with reference to FIG. 5, or the modulator 702 may be an external modulator as schematically depicted in FIG. 7. In certain embodiments, the controller 114 provides linked control of the modulator 702 and the translation stage 708.

In certain embodiments, the systems described herein (e.g., the systems 100, 500, 600, and 700) may form an image on a target substrate using multiple passes of a laser beam relative to the target substrate. For example, two, three, four, five, six, seven, eight, or more passes may be used in various embodiments. In some embodiments, a first laser pass (an "imaging pass") is used to form an image on the substrate. The imaging pass may utilize relatively high laser fluence in order to provide deeper texturing of the substrate surface. In some cases, the image formed by the imaging pass may have relatively poor visibility (e.g., the image is obscured when the surface is viewed in visible light) due to debris formed on the surface of the substrate. The debris may include slag, melted regions, heat-affected zones, and so forth. In some cases, the debris cannot be effectively removed using conventional cleaning techniques such as, for example, cleaning in an ultrasonic bath. The imaging pass may be performed at a relatively low average scan speed (e.g., about 100 mm/s to about 200 mm/s) to provide a relatively high resolution image (e.g., 2000 dots per inch in some examples).

In certain embodiments, the visibility of the image formed after the imaging pass may be improved by making one or more additional passes with the laser beam ("cleaning passes"). The cleaning passes may remove from the surface of the substrate some or all of the debris formed by the imaging pass, thereby improving the visibility of the image. In some cases, the visibility of the image is significantly greater after one or more cleaning passes. In some embodiments, a single cleaning pass is used. In other embodiments, two, three, four, five, six, or more cleaning passes are used. In certain implementations, the cleaning passes are performed using the same laser parameters (e.g., wavelength, duration, repetition rate, energy, fluence, etc.) as used for the imaging pass. In certain such implementations, the cleaning passes are performed at a scan speed that is greater than the scan speed used for the imaging pass. For example, a cleaning pass may be performed at a scan speed that is a multiple of the scan speed of the imaging pass. The multiple may be, for example, two, three, four, five, ten, or more. Other multiples may be used, and the multiple may be different for different cleaning passes. In other embodiments, some or all of the laser parameters used for the imaging pass and a cleaning pass may be different. Also, some or all of the laser parameters for different cleaning passes may be different. In some implementations, a first laser system provides the beam for the imaging pass, and a second laser system provides the beam for the cleaning passes. Many variations are possible.

Accordingly, in certain embodiments, multiple passes of a laser beam relative to a target substrate are used to provide improved visibility one-dimensional and/or two-dimensional images on the surface of a target substrate. In certain such embodiments, use of relatively high laser fluence during the imaging and/or cleaning passes advantageously may increase the contrast of the image and/or may reduce the angular dependence of the visibility of the final image (e.g., the image produced after one or more cleaning passes). Relatively high quality images may be produced at relatively high resolutions (e.g., 2000 dpi) in certain implementations.

FIGS. 8A and 8B are photographs showing the results of an example of the multiple-pass imaging technique. FIG. 8B shows the image produced after the imaging pass, and FIG. 8A shows the final image after four cleaning passes. The increase in the quality of the visibility of the image after the cleaning passes is readily apparent by comparing the image in FIG. 8B (after laser cleaning) to the image in FIG. 8A (after imaging but before laser cleaning). In some cases, the improvement in visibility from the imaging pass to the final cleaning pass corresponds to an improvement in image contrast by a factor of four or more. For example, the image in FIG. 8B (after the imaging pass) has about 2-4 levels of gray, whereas the image in FIG. 8A (after four cleaning passes) has 16 levels of gray.

In the example shown in FIGS. 8A and 8B, a 2000 dpi image was machined on an aluminum substrate using a system generally similar to the system 100 described with respect to FIG. 1. The laser system output ultrashort pulses having a wavelength of about 1040 nm, pulse widths less than about 1 ps, pulse energies of about 10 µJ, and a pulse repetition rate of about 200 kHz. In this example, the average fluence (determined from the pulse energy divided by a $1/e^2$ beam area) of the imaging pass and the cleaning pass was about 6 J/cm². The scanning system provided a focal spot diameter of about 15 µm on the substrate surface. The imaging pass was performed at an average scan speed of about 200 mm/sec, and the cleaning pass was performed at an average scan speed of about 5000 mm/sec. In this example, during the cleaning passes, the laser beam scanned the image area with linear scan lines having a pitch of less than about 20 µm. The laser beam did not replicate the image formed by the imaging pass. In other examples, the cleaning passes may utilize a different scan line pitch and/or a different scanning pattern.

Further embodiments of systems capable of using ultrashort laser pulses to provide surface texturing of a solid substrate are disclosed in U.S. patent application Ser. No. 11/314,197, entitled "Pulsed Laser Source with Adjustable Grating Compressor," filed Dec. 20, 2005, published as U.S. Patent Application Publication US 2006/0159137, which is hereby incorporated by reference herein in its entirety. Additional embodiments of systems capable of using ultrashort laser pulses to provide surface texturing of a solid substrate are disclosed in U.S. patent application Ser. No. 11/336,383, entitled "Laser Material Micromachining with Green Femtosecond Pulses," filed Jan. 20, 2006, published as U.S. Patent Application Publication US 2006/0207976, which is hereby incorporated by reference herein in its entirety.

Further information may be found in the following documents:

P. S. Banks, M. D. Feit, A. M. Rubenchik, B. C. Stuart, M. D. Perry, "Material effects in ultra-short pulse laser drilling of metals," 5th International Conference on Laser Ablation COLA 1999;

M. Groenendijk and J. Meijer, "Surface microstructuring and the influence of heat accumulation during femtosecond pulsed laser ablation," 4th International Conference on Laser Advanced Materials Processing LAMP 2006;

T.-H. Her, R. J. Finlay, C. Wu, S. Deliwala, E. Mazur, Appl. Phys. Lett. 73 (1998), p. 1673;

T.-H. Her, R. J. Finlay, C. Wu, E. Mazur, Appl. Phys. A 70 (2000), p. 383;

C. Wu, C. H. Crouch, L. Zhoa, J. E. Carey, R. J. Younkin, J. A. Levinson, E. Mazur, R. M. Farrel, P. Gothoskar, and A. Karger, Appl. Phys. Lett. 78 (2001) p. 1850;

R. J. Younkin, J. E. Carey, E. Mazur, J. A. Levinson, C. M. Friend, J. Appl. Phys. 93 (2003) p. 2626;

C. H. Crouch, J. E. Caney, M. Shen, E. Mazur, F. Y. Genin, Appl. Phys. A 79 (2004) p. 1635;

C. H. Crouch, J. E. Caney, J. M. Warrender, M. J. Aziz, E. Mazur, F. Y. Genin, Appl. Phys. Lett. 84 (2004) p. 1850;

J. E. Carrey, C. H. Crouch, M. Shen, E. Mazur, Opt. Lett. 30 (2005) p. 1773;

C. Wu, C. H. Crouch, L. Zhao, E. Mazur, Appl. Phys. Lett. 81 (2002) p. 1999.

The entire disclosure of each of the above documents is hereby incorporated by reference herein.

The above detailed description of preferred embodiments and examples has been given by way of illustration, and is not intended to limit the range of apparatus, systems, and methods disclosed. From the disclosure herein, those skilled in the art will not only understand the present disclosure and its attendant advantages, but will also find apparent various changes, equivalents, and modifications to the described embodiments and examples. Additionally, a skilled artisan will recognize that not every embodiment and example need achieve each advantage described herein, and that certain embodiments and examples may optimize one advantage or group of advantages without necessarily optimizing other advantages or groups of advantages. Additionally, the actions in the example methods described herein may be performed or carried out in any suitable order and are not limited to the particular illustrative order described herein. Many variations are possible and are contemplated within the scope of this disclosure.

What is claimed is:

1. A method of modifying a medium so that a grayscale image is obtainable from the medium, the method comprising:
    providing a medium having a surface;
    scanning a laser beam relative to the surface, the laser beam comprising a plurality of optical pulses having a pulse width less than about 100 picoseconds, the laser beam delivering optical energy to the surface of the medium; and
    varying the optical energy delivered to different regions of the surface of the medium, thereby altering at least one of reflectivity, absorptivity, or diffractive properties of the regions to provide the grayscale image obtainable from the medium,
    wherein at least a portion of said plurality of pulses of said laser beam are generated at a repetition rate greater than 100 kHz and focused into focal spots having focal spot diameters,
    wherein at said repetition rate greater than 100 kHz accumulation of overlapping pulses within said medium and over said focal spot diameters results in improved contrast in said greyscale image while forming an image portion in a shorter time relative to contrast at time obtainable at a repetition rate less than 100 kHz.

2. The method of claim 1, wherein said plurality of pulses is generated at a repetition rate greater than about 10 kHz.

3. The method of claim 1, wherein the pulse width of the optical pulses is less than about 10 picoseconds.

4. The method of claim 1, wherein the optical pulses have an energy in a range from about 100 nJ to about 100 µJ.

5. The method of claim 1, further comprising receiving an electronic image file comprising information related to an image that is to be substantially replicated as the grayscale image obtainable from the medium.

6. The method of claim 1, wherein varying the optical energy comprises modulating a scan speed of the laser beam relative to the surface.

7. The method of claim 1, wherein varying the optical energy comprises varying overlap of focal spot sizes of the optical pulses at the surface of the medium.

8. The method of claim 1, wherein altering at least one of reflectivity, absorptivity, or diffractive properties comprises altering the reflectivity.

9. The method of claim 1, wherein the grayscale image is obtainable by illuminating the medium with light.

10. A medium modified by the method of claim 1 so that a grayscale image is obtainable from the medium wherein the grayscale image comprises a representation of a person, an animal, a natural structure, a manmade structure, or a work of artistic expression.

11. A system of modifying a medium so that a grayscale image is obtainable from the medium, the system comprising:
    a laser source capable of outputting a laser beam comprising a plurality of optical pulses having a pulse width less than about 100 picoseconds, wherein the laser source comprises a fiber laser and further comprises an optical modulator;
    a support for holding a medium having a surface;
    a scanning system configured to relatively scan the laser beam with respect to the surface of the medium; and
    a controller configured to vary optical energy delivered by the laser beam to different regions of the surface of the medium based on a desired grayscale, thereby altering at least one of reflectivity, absorptivity, or diffractivity of the regions to provide the grayscale image obtainable from the medium, said controller configured to generate pulses at a variable repetition rate by controlling said optical modulator, at least some pulses being generated at a repetition rate greater than 100 kHz.

12. The system of claim 11, wherein the laser source further comprises a frequency converter.

13. The system of claim 11, wherein the laser source comprises an oscillator and an amplifier.

14. The system of claim 11, wherein the scanning system is configured to scan the laser beam with respect to the surface of the medium at a first scan speed and at a second scan speed, the second scan speed greater than the first scan speed.

15. A medium modified by the system of claim 11 so that a grayscale image is obtainable from the medium, wherein the grayscale image comprises a representation of a person, an animal, a natural structure, a manmade structure, or a work of artistic expression.

16. A method of modifying a medium having a surface so that a grayscale image is obtainable from the medium, the method comprising:

scanning a first laser beam relative to the surface at a first scan speed, the first laser beam comprising a plurality of first optical pulses having a first pulse width less than about 100 picoseconds, wherein at least a portion of said plurality of first optical pulses of said first laser beam are generated at a repetition rate greater than 100 kHz, the first laser beam delivering first optical energy to an area of the surface of the medium;

varying the first optical energy delivered to different regions of the area by the first laser beam, thereby altering at least one of the reflectivity, absorptivity, or diffractive properties of the regions in the area to provide a first grayscale image obtainable from the medium, the first grayscale image having a first visibility;

scanning a second laser beam relative to the surface at a second scan speed, the second scan speed greater than the first scan speed, the second laser beam comprising a plurality of second optical pulses having a second pulse width less than about 100 picoseconds, wherein at least a portion of said plurality of second optical pulses of said second laser beam are generated at a repetition rate greater than 100 kHz, the second laser beam delivering second optical energy to at least a portion of the area scanned by the first laser beam; and varying the second optical energy delivered to different regions in the area, thereby providing a second grayscale image obtainable from the medium, the second grayscale image having a second visibility, the second visibility greater than the first visibility.

17. The method of claim 16, wherein the first pulse width is substantially the same as the second pulse width.

* * * * *

UNITED STATES PATENT AND TRADEMARK OFFICE
CERTIFICATE OF CORRECTION

PATENT NO. : 8,995,029 B2  
APPLICATION NO. : 14/198434  
DATED : March 31, 2015  
INVENTOR(S) : Lawrence Shah et al.

Page 1 of 1

It is certified that error appears in the above-identified patent and that said Letters Patent is hereby corrected as shown below:

Title page

On Page 2, item (56) in column 1 at line 1, change "60/866,285," to --60/886,285,--.

Specification

In column 17 at line 52, change "minors" to --mirrors--.

In column 19 at line 25, change "µJ" to --pJ--.

In column 20 at line 50, change "CPDB 1," to --CPDB1,--.

In column 25 at line 25, change "Caney," to --Carrey,--.

In column 25 at line 27, change "Caney," to --Carrey,--.

Claims

In column 26 at line 8, in Claim 1, change "greyscale" to --grayscale--.

Signed and Sealed this  
Eighth Day of December, 2015

Michelle K. Lee  
*Director of the United States Patent and Trademark Office*